(12) United States Patent
Figgins et al.

(10) Patent No.: US 9,362,792 B2
(45) Date of Patent: Jun. 7, 2016

(54) RADIALLY EMBEDDED PERMANENT MAGNET ROTOR HAVING MAGNET RETENTION FEATURES AND METHODS THEREOF

(71) Applicant: Regal Beloit America, Inc., Beloit, WI (US)

(72) Inventors: Daniel Shawn Figgins, Fort Wayne, IN (US); Michael Allen Marks, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 17 days.

(21) Appl. No.: 13/652,161

(22) Filed: Oct. 15, 2012

(65) Prior Publication Data

US 2014/0103771 A1   Apr. 17, 2014

(51) Int. Cl.
| | | |
|---|---|---|
| H02K 21/12 | (2006.01) |
| H02K 1/22 | (2006.01) |
| H02K 15/00 | (2006.01) |
| H02K 1/28 | (2006.01) |
| H02K 15/03 | (2006.01) |

(Continued)

(52) U.S. Cl.
CPC ................ *H02K 1/28* (2013.01); *H02K 1/2773* (2013.01); *H02K 15/03* (2013.01); *H02K 21/16* (2013.01); *Y10T 29/49012* (2015.01)

(58) Field of Classification Search
CPC .................................. H02K 1/27; H02K 21/14
USPC ......... 310/156.1, 156.16, 156.18–19, 156.23, 310/156.72–73, 156.76–77, 216.113, 310/216.137, 269, 154.16, 156.21, 156.33, 310/156.15, 156.27, 156.57, 26.137, 261.1
See application file for complete search history.

(56) References Cited

U.S. PATENT DOCUMENTS

| | | | |
|---|---|---|---|
| 1,298,465 A | 3/1919 | Dean |
| 2,059,518 A | 11/1936 | Harley |
| 2,312,101 A | 2/1943 | Killam et al. |

(Continued)

FOREIGN PATENT DOCUMENTS

| | | |
|---|---|---|
| CN | 102111025 A | 6/2011 |
| CN | 102468051 A | 5/2012 |

(Continued)

OTHER PUBLICATIONS

Machine Translation EA014510 (2010).*

(Continued)

*Primary Examiner* — Jose Gonzalez Quinones
(74) *Attorney, Agent, or Firm* — Armstrong Teasdale LLP

(57) ABSTRACT

In one embodiment, a permanent magnet rotor is provided. The permanent magnet rotor includes a substantially cylindrical rotor core including an outer edge, an inner edge, and opposed first and second ends. The rotor further includes a first wall and a second wall defining at least one radial aperture extending radially through the rotor core. The rotor further includes at least one permanent magnet positioned within the at least one radial aperture. A first indentation is formed in one of the at least one permanent magnet and the first wall, the first indentation defining a first space between the at least one permanent magnet and the radial aperture first wall. The rotor further includes a first material positioned within the first space, the material configured to substantially prevent movement of the permanent magnet relative to the at least one radial aperture.

19 Claims, 20 Drawing Sheets

(51) Int. Cl.
*H02K 21/16* (2006.01)
*H02K 1/27* (2006.01)

(56) References Cited

U.S. PATENT DOCUMENTS

| | | |
|---|---|---|
| 2,486,656 A | 11/1949 | Klinkhamer |
| 2,498,704 A | 2/1950 | Oswald |
| 2,519,919 A | 8/1950 | Merrill |
| 2,794,137 A | 5/1957 | Faus et al. |
| 2,927,229 A | 3/1960 | Merrill |
| 3,111,596 A | 11/1963 | Lovegrove |
| 3,210,582 A | 10/1965 | Miller |
| 3,221,194 A | 11/1965 | Blackburn |
| 3,344,325 A | 9/1967 | Sklaroff |
| 3,417,295 A | 12/1968 | Littwin |
| 3,466,518 A | 9/1969 | Aylikci et al. |
| 3,513,341 A | 5/1970 | Gratzmuller |
| 3,555,324 A | 1/1971 | Lovegrove |
| 3,599,024 A | 8/1971 | Kitamura |
| 3,872,334 A | 3/1975 | Loubier |
| 3,943,392 A * | 3/1976 | Keuper et al. ........ 310/215 |
| 3,950,663 A | 4/1976 | Mead |
| 3,979,821 A | 9/1976 | Noodleman |
| 4,059,898 A | 11/1977 | Adair |
| 4,104,787 A | 8/1978 | Jandeska et al. |
| 4,143,289 A | 3/1979 | Williams |
| 4,327,302 A | 4/1982 | Hershberger |
| 4,434,546 A | 3/1984 | Hershberger |
| 4,614,888 A | 9/1986 | Mosher et al. |
| 4,631,807 A | 12/1986 | Kawada et al. |
| 4,658,167 A | 4/1987 | Popov et al. |
| 4,725,750 A | 2/1988 | Welch |
| 4,741,094 A | 5/1988 | Denk et al. |
| 4,954,736 A | 9/1990 | Kawamoto et al. |
| 4,977,344 A | 12/1990 | Obradovic |
| 5,010,266 A | 4/1991 | Uchida |
| 5,023,502 A | 6/1991 | Johnson |
| 5,091,668 A | 2/1992 | Cuenot et al. |
| 5,140,211 A | 8/1992 | Ucida |
| 5,157,297 A | 10/1992 | Uchida |
| 5,200,662 A | 4/1993 | Tagami et al. |
| 5,411,608 A | 5/1995 | Hazelton et al. |
| 5,500,994 A | 3/1996 | Itaya |
| 5,557,248 A | 9/1996 | Prochazka |
| 5,645,651 A | 7/1997 | Fujimura et al. |
| 5,684,352 A | 11/1997 | Mita et al. |
| 5,786,650 A | 7/1998 | Uchida et al. |
| 5,786,652 A | 7/1998 | Gueraud et al. |
| 5,806,169 A | 9/1998 | Trago et al. |
| 5,818,141 A | 10/1998 | Cho et al. |
| 5,829,120 A | 11/1998 | Uchida et al. |
| 5,889,346 A | 3/1999 | Uchida et al. |
| 5,990,592 A | 11/1999 | Miura et al. |
| 6,200,662 B1 | 3/2001 | Mussallem, III |
| 6,218,753 B1 | 4/2001 | Asano et al. |
| 6,265,802 B1 | 7/2001 | Getschmann |
| 6,340,857 B2 | 1/2002 | Nishiyama et al. |
| 6,359,366 B1 | 3/2002 | Liang et al. |
| 6,389,538 B1 | 5/2002 | Gruse et al. |
| 6,392,324 B1 | 5/2002 | Kuwahara |
| 6,426,576 B1 | 7/2002 | Varenne |
| 6,452,301 B1 | 9/2002 | Van Dine et al. |
| 6,519,833 B2 | 2/2003 | Futami et al. |
| 6,657,349 B2 | 12/2003 | Fukushima |
| 6,674,213 B2 | 1/2004 | Berger |
| 6,703,741 B1 | 3/2004 | Ifrim |
| 6,707,209 B2 | 3/2004 | Crapo et al. |
| 6,785,951 B2 | 9/2004 | Carl, Jr. et al. |
| 6,794,839 B1 | 9/2004 | Maslov et al. |
| 6,987,342 B2 | 1/2006 | Hans |
| 7,091,645 B2 | 8/2006 | Yoneda et al. |
| 7,148,598 B2 | 12/2006 | Ionel et al. |
| 7,157,827 B2 | 1/2007 | Heideman et al. |
| 7,332,845 B2 | 2/2008 | Heideman et al. |
| 7,626,349 B2 | 12/2009 | Marcinkiewicz et al. |
| 7,800,272 B2 | 9/2010 | Nakayama et al. |
| 7,868,503 B1 | 1/2011 | Nakayama et al. |
| 8,004,140 B2 | 8/2011 | Alexander et al. |
| 8,018,110 B2 | 9/2011 | Alexander et al. |
| 8,080,907 B2 | 12/2011 | Jeung |
| 8,138,649 B2 | 3/2012 | Bradfield |
| 8,482,179 B2 | 7/2013 | Nakamura et al. |
| 8,692,432 B2 | 4/2014 | Kingrey et al. |
| 8,981,609 B2 | 3/2015 | Joeckel |
| 9,083,219 B2 | 7/2015 | Choi et al. |
| 2003/0052561 A1 | 3/2003 | Rahman et al. |
| 2003/0214194 A1 | 11/2003 | Carl, Jr. et al. |
| 2004/0004407 A1 | 1/2004 | Laurent et al. |
| 2004/0124728 A1 | 7/2004 | Yamaguchi et al. |
| 2004/0245881 A1 | 12/2004 | Kadoya et al. |
| 2005/0093391 A1 | 5/2005 | McMullen et al. |
| 2010/0308682 A1 | 12/2010 | Horng et al. |
| 2011/0115126 A1* | 5/2011 | Matsubayashi et al. ...... 264/273 |
| 2011/0127859 A1 | 6/2011 | Amrhein et al. |
| 2012/0104907 A1 | 5/2012 | Zeng et al. |
| 2012/0132783 A1 | 5/2012 | Jia |
| 2012/0139373 A1 | 6/2012 | Jia et al. |
| 2012/0181895 A1 | 7/2012 | Pan |
| 2012/0194011 A1 | 8/2012 | Liu et al. |

FOREIGN PATENT DOCUMENTS

| | | | |
|---|---|---|---|
| GB | 2159342 A | * | 11/1985 |
| JP | 55133654 A | | 10/1980 |
| JP | 57186964 A | * | 11/1982 |
| JP | 2002 218683 A | | 8/2002 |
| RU | EA014510 B1 | * | 12/2010 |
| WO | 2008113082 A1 | | 9/2008 |
| WO | 2010014844 A2 | | 2/2010 |
| WO | 2010014844 A3 | | 7/2010 |
| WO | 2011076028 A1 | | 6/2011 |

OTHER PUBLICATIONS

PowerPoint slides of Broad Ocean Motor (Model BOM ZWK70200550601) dated Sep. 13, 2012.
Office Action in U.S. Appl. No. 13/652,227 issued Apr. 11, 2014.
Office Action in U.S. Appl. No. 13/652,035 issued May 22, 2014.
Office Action in U.S. Appl. No. 13/652,035 issued Nov. 4, 2014.
Office Action issued in U.S. Appl. No. 13/652,127 mailed Jan. 23, 2015.
Office Action issued in U.S. Appl. No. 13/652,035 mailed Mar. 13, 2015.
Notice of Allowance and Fee(s) Due, U.S. Appl. No. 13/652,127 mailed May 5, 2015, 11 pages.

\* cited by examiner

WINDING OPTIMIZATION TO INCREAS EFF.

RADIALLY EMBEDDED PERMANENT MAGNET ROTOR HAVING MAGNET RETENTION FEATURES AND METHODS THEREOF

BACKGROUND

The field of the disclosure relates generally to electric motors, and more particularly, to radially embedded permanent magnet rotors and alternative materials for use in electric motors.

Various types of electric machines include permanent magnets. For example, a brushless direct current (BLDC) motor may include a plurality of permanent magnets coupled to an exterior surface of a rotor core. Typically, the permanent magnets are coupled to the exterior surface of the rotor core using an adhesive and/or an outer retaining covering. This coupling between the permanent magnets and the rotor core must resist forces exerted on the permanent magnets during high speed rotation tending to separate the permanent magnets from the motor.

Permanent magnets may also be positioned within a rotor core, commonly referred to as an interior permanent magnet rotor. Slots are formed within the rotor, and magnets are inserted into the slots. The magnet slots must be larger than the magnets to allow the magnets to be inserted. However, the magnets must be secured within the slots to prevent movement of the magnets during operation of the machine. The performance of the machine depends on maintaining the magnets in a known position within the rotor. An adhesive may be used to secure the magnets in a fixed position relative to the rotor. However, adhesives have a limited life due to factors such as temperature, temperature cycling, and environmental conditions.

Many known electric machines produce work by generating torque, which is the product of flux, stator current and other constants. In electric motors, flux is typically produced by permanent magnets positioned on a rotor within the motor. Some known rare earth permanent magnets, such as neodymium iron boron magnets, generate greater amounts of flux than typical ferrite permanent magnets. However, the cost of rare earth magnets has drastically risen in recent years, prompting the need for low-cost permanent magnet systems that generate similar amounts of flux and provide efficiencies similar to systems using rare earth magnets.

BRIEF DESCRIPTION

In one embodiment, a permanent magnet rotor is provided. The permanent magnet rotor includes a substantially cylindrical rotor core including an outer edge, an inner edge, and opposed first and second ends. The rotor further includes a first wall and a second wall defining at least one radial aperture extending radially through the rotor core. The rotor further includes at least one permanent magnet positioned within the at least one radial aperture. A first indentation is formed in one of the at least one permanent magnet and the first wall, the first indentation defining a first space between the at least one permanent magnet and the radial aperture first wall. The rotor further includes a first material positioned within the first space, the material configured to substantially prevent movement of the permanent magnet relative to the at least one radial aperture.

In another embodiment, a method of manufacturing a permanent magnet rotor is provided. The method includes providing a rotor core including an outer edge, an inner edge, and opposed first and second ends, the rotor further including a first and second wall defining at least one radial aperture extending radially through the rotor core. The method further includes providing a permanent magnet, forming a first indentation in one of the permanent magnet and the first wall, and inserting the permanent magnet into the at least one radial aperture such that the indentation defines a first space between the permanent magnet and the first wall. The method further includes inserting a first material into the first space, the first material configured to substantially prevent movement of the permanent magnet relative to the first and second walls.

DETAILED DESCRIPTION

Due to increased costs of rare earth magnets and copper used for windings, lower cost alternative materials are desirable in the design and manufacture of electric motors. This disclosure provides designs and methods using material alternatives to rare earth magnets and copper windings while reducing or recapturing the efficiency losses associated with those alternative materials and reducing or eliminating an increase of the length of the motor.

Figure 1:
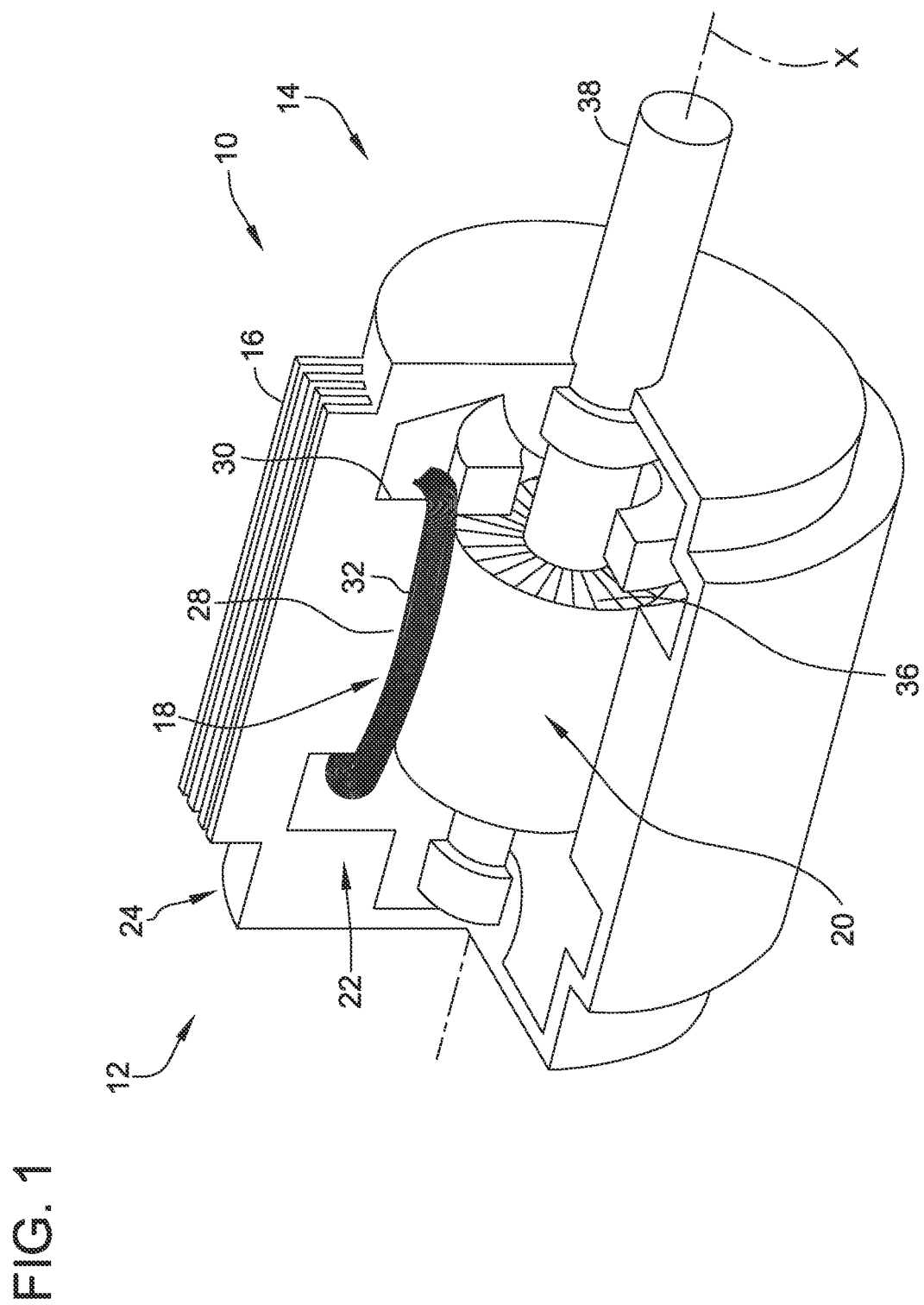
FIG. 1 is a perspective cut-away view of an exemplary electric machine.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stationary assembly 18 and a rotatable assembly 20. Motor assembly housing 16 defines an interior 22 and an exterior 24 of motor 10 and is configured to at least partially enclose and protect stationary assembly 18 and rotatable assembly 20. Stationary assembly includes a stator core 28, which includes a plurality of teeth 30 and a plurality of windings 32 wound around stator teeth 30. In the exemplary embodiment, stator core 28 is a twelve tooth stator structure. Alternatively, stator core 28 may include any number of teeth that enables motor 10 to function as described herein, for example, stator core 28 may have nine teeth. Furthermore, in an exemplary embodiment, stationary assembly 18 is a three-phase salient pole stator assembly and stator core 28 is formed from a stack of laminations made of highly magnetically permeable material. Alternatively, stationary assembly 18 is a single phase salient pole stator assembly. Stationary assembly 18 may be a round, segmented, or roll-up type stator construction and windings 32 are wound on stator core 28 in any suitable manner that enables motor 10 to function as described herein. For example, windings 32 may be concentrated type or overlapped type windings.

Rotatable assembly 20 includes a permanent magnet rotor core 36 and a shaft 38. In the exemplary embodiment, rotor core 36 is formed from a stack of laminations made of magnetically permeable material. Alternatively, rotor core 36 is a solid core. Rotor core 36 is substantially received in a central bore of stator core 28 for rotation along an axis of rotation X. FIG. 1 illustrates rotor core 36 and stator core 28 as solid for simplicity. While FIG. 1 is an illustration of a three phase electric motor, the methods and apparatus described herein may be included within motors having any number of phases, including single phase and multiple phase electric motors.

In the exemplary embodiment, electric motor 10 is coupled to a fan or centrifugal blower (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
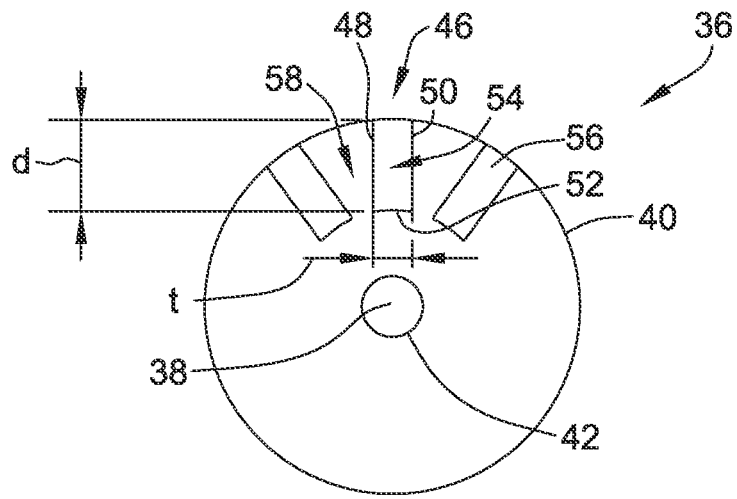
FIG. 2 is a front view of an exemplary rotor core that may be included within the electric machine shown in FIG. 1.

FIG. 2 is a front view of an exemplary embodiment of rotor core 36 that may be included within electric motor 10 (shown in FIG. 1). In the exemplary embodiment, rotatable assembly 20, also referred to as a radially embedded permanent magnet rotor, includes a rotor core 36 and a shaft 38. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, rotatable assembly 20 is driven by an electronic control (not shown), for example, a sinusoidal or trapezoidal electronic control.

Rotor core 36 is substantially cylindrical and includes an outer edge 40 and a shaft central opening or inner edge 42 having a diameter corresponding to the diameter of shaft 38. Rotor core 36 and shaft 38 are concentric and are configured to rotate about axis of rotation X (shown in FIG. 1). In the exemplary embodiment, rotor core 36 includes a plurality of laminations 44 that are either interlocked or loose. For example, laminations 44 are fabricated from multiple punched layers of stamped metal such as steel. In an alternative embodiment, rotor core 36 is a solid core. For example, rotor core 36 may be fabricated using a sintering process from a soft magnetic composite (SMC) material, a soft magnetic alloy (SMA) material, and/or a powdered ferrite material.

In the exemplary embodiment, rotor core 36 includes a plurality of radial apertures 46. For example, a first wall 48, a second wall 50 and a third wall 52 define a first radial aperture 54 of the plurality of radial apertures 46. Each radial aperture 46 includes a depth d and thickness t and extends axially through rotor core 36 from first end 12 (shown in FIG. 1) to second end 14 (also shown in FIG. 1). Each radial aperture 46 is configured to receive one or more permanent magnets 56 such that each magnet 56 is radially embedded in rotor core 36 and extends at least partially from rotor first end 12 to rotor second end 14. In the exemplary embodiment, permanent magnets 56 are hard ferrite magnets magnetized in a direction tangent to axis of rotation X. However, magnet 56 may be fabricated from any suitable material that enables motor 10 to function as described herein, for example, bonded neodymium, sintered neodymium, and/or samarium cobalt.

Figure 3:
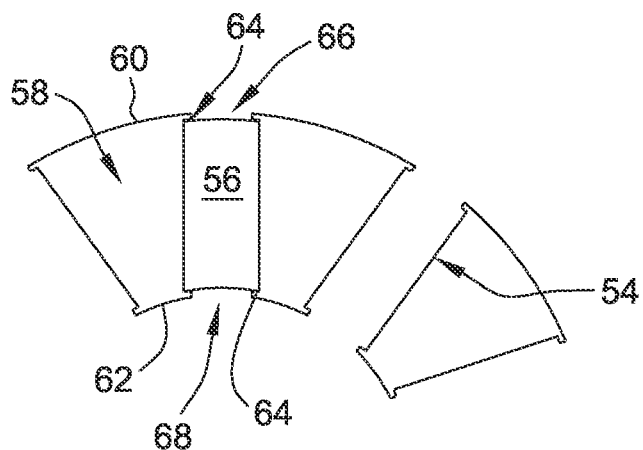
FIG. 3 is a front view of another exemplary rotor core that may be included within the electric machine shown in FIG. 1.

In the exemplary embodiment, rotor core 36 includes a plurality of rotor poles 58, each having an outer wall 60 along rotor outer edge 40 and an inner wall 62 (shown in FIG. 3). In the exemplary embodiment, the number of radial apertures 46 is equal to the number of rotor poles 58, and one magnet 56 is positioned within each radial aperture 46 between a pair of rotor poles 58. Although illustrated as including ten rotor poles 58, rotor core 36 may have any number of poles that allows motor 10 to function as described herein, for example, six, eight or twelve poles.

In the exemplary embodiment, the design of radially embedded permanent magnet rotor core 36 utilizes lower-cost magnets, yet achieves the power densities and high efficiency of machines using higher-cost magnets, such as neodymium magnets. In the exemplary embodiment, increased efficiency and power density of motor 10 is obtained by increasing the flux produced by rotor core 36. Increased flux generation is facilitated by magnets 56 positioned in radial apertures 46 at depth d, between a minimum magnet depth and a maximum magnet depth. The minimum magnet depth is defined by the equation:

$$D_{min} = \frac{(\pi * R)}{n},$$

wherein $D_{min}$ represents the minimum depth variable, R represents the rotor radius, and n represents the number of rotor poles. The maximum magnet depth is defined by the equation:

$$D_{max} = R - \frac{0.5t}{\tan\left(\frac{180}{n}\right)},$$

wherein $D_{max}$ represents the maximum depth variable, R represents the rotor radius, t represents the magnet thickness in the direction of magnetization, and n represents the number of rotor poles. In the exemplary embodiment, rotor core 36 facilitates increased flux production resulting in optimum efficiency and power density when magnets 56 extend into radial aperture at a depth between $D_{min}$ and $D_{max}$.

FIG. 3 is a front view of another exemplary embodiment of rotor core 36 that may be included within electric motor 10. In the exemplary embodiment, rotor core 36 includes radial apertures 46 configured to receive one or more permanent magnets 56. In the exemplary embodiment, radial apertures 46 are generally rectangular. Alternatively, radial apertures 46 may have any suitable shape corresponding to the shape of the permanent magnets that enables electric motor to function as described herein. For example, radial apertures 46 may be tapered, as described in more detail below.

In the exemplary embodiment, radial aperture 46 includes one or more permanent magnet retention member or protrusion 64. For example, a first pair of protrusions 66 is located proximate pole outer wall 60 along rotor outer edge 40 and extends into radial aperture 46 from first and second walls 48 and 50. Each protrusion 64 of the first pair of protrusions 66 is configured to facilitate retention of magnet 56 within radial aperture 46 by substantially preventing movement of magnet 56 in a radial direction towards outer edge 40. Further, a second pair of protrusions 68 is located along pole inner wall 62 and extends into radial aperture 46 from first and second walls 48 and 50. Each protrusion 64 of the second pair of protrusions 68 is configured to facilitate retention of magnet 56 within radial aperture 46 by substantially preventing movement of magnet 56 in a radial direction towards shaft 38. Alternatively, rotor core 36 may have any number and location of protrusions 64 that enable rotor core 36 to function as described herein.

Figure 4:
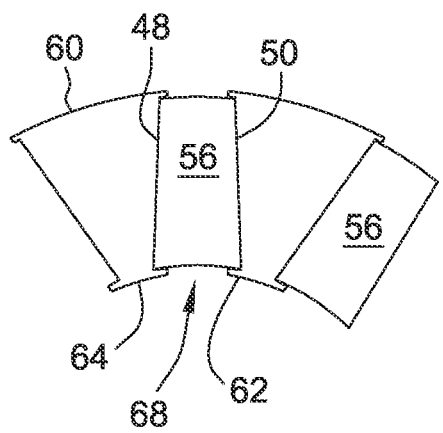
FIG. 4 is a front view of another exemplary rotor core that may be included within the electric machine shown in FIG. 1.

FIG. 4 is a front view of another exemplary embodiment of rotor core 36 that may be included within electric motor 10. Rotor core 36 includes radial apertures 46 configured to receive one or more permanent magnet 56. In the exemplary embodiment, radial apertures 46 and magnet 56 are generally tapered. First and second walls 48 and 50 of radial aperture 46 converge as they extend from rotor inner wall 62 to rotor outer wall 60 and are configured to engage the tapered walls of magnet 56 to facilitate retention of magnet 56 within radial aperture 46 by substantially preventing movement of magnet 56 in a radial direction towards rotor outer edge 40. Furthermore, each tapered radial aperture 46 may include a pair of protrusions 68 located along pole inner wall 62 to facilitate retention of magnet 56 within radial aperture 46 by substantially preventing movement of magnet 56 in a radial direction towards shaft 38.

Figure 5:
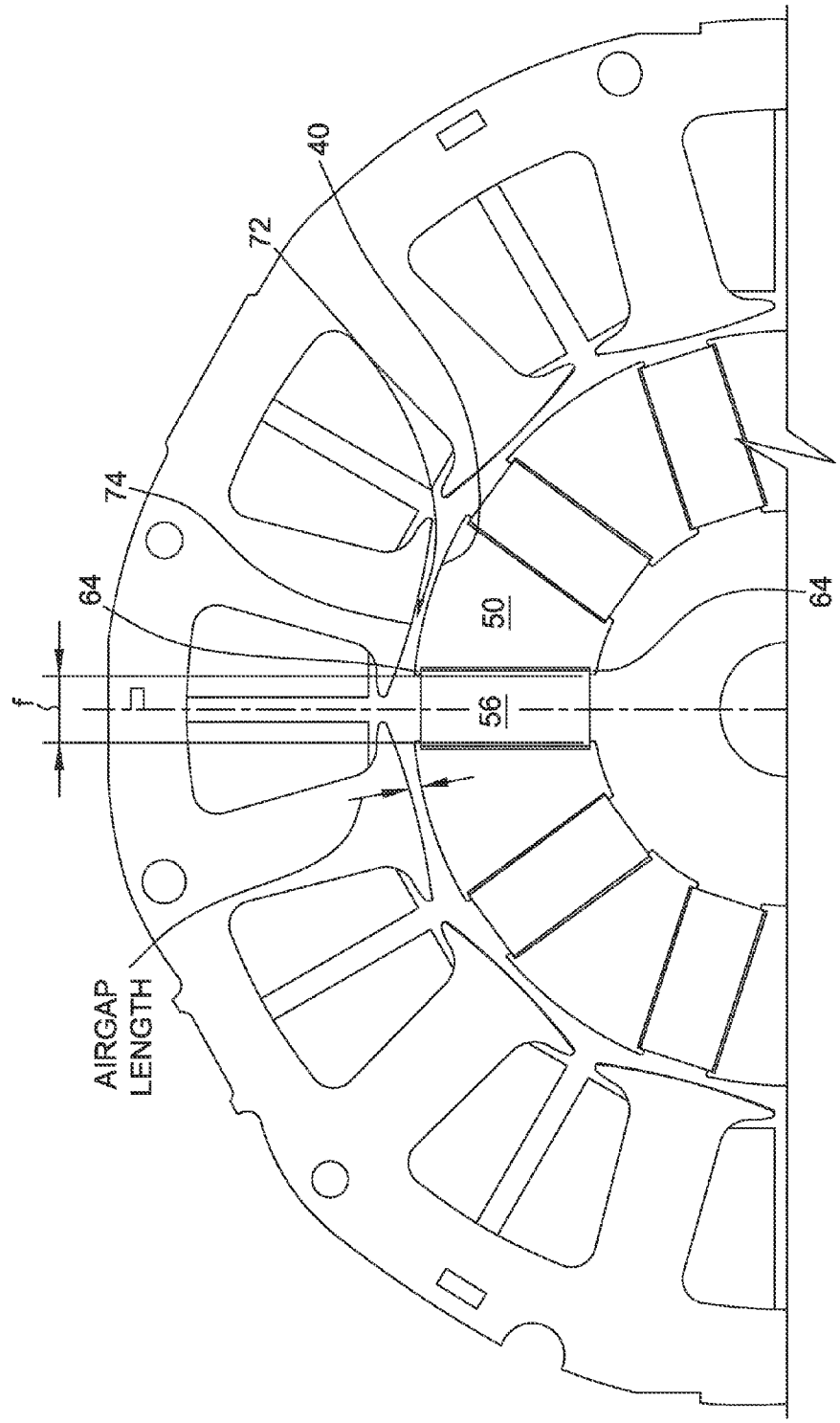
FIG. 5 is a front view of the exemplary rotor core shown in FIG. 3 positioned within a stator core.

FIG. 5 is a front view of rotor core 36 shown in FIG. 3 positioned within stator core 28. In the exemplary embodiment, rotor core 36 is positioned relative to stator core 28, and rotor outer edge 40 and an inner edge 74 of stator core 28 define a small air gap 72. Air gap 72 allows for relatively free rotation of rotor core 36 within stator core 28. Radially embedded magnets 56 of rotor core 36 are configured to facilitate increased flux to air gap 72, resulting in increased motor torque generation. The radial orientation of radially embedded magnets 56 results in the magnet flux only crossing the magnet once, as opposed to the flux produced by surface-mounted magnets, which must cross the magnets twice. Crossing magnet 56 only once significantly reduces the path of the flux through material of low permeability (i.e. air and magnet 56), resulting in increased flux delivery and torque. Increased flux delivery and torque also result from radial magnets 56 of the same polarity positioned on opposite edges 48 and 50 of each rotor pole 58, which focuses flux toward rotor outer edge 40. However, any magnetic support structure above or below magnet 56 in a radial direction provides a path for flux to flow without crossing air gap 72, resulting in torque losses. In the exemplary embodiment of FIG. 5, only a small or limited amount of magnetic material (i.e. protrusions 64) is positioned above or below magnet 56. Alternatively, rotor core 36 does not include any magnetic material immediately above or below magnet 56 such that no magnetic material is positioned between permanent magnet 56 and rotor outer edge 40 and between permanent magnet 56 and inner sleeve 138 (see FIG. 15).

In the exemplary embodiment, rotor poles 58 are spaced from each other a distance f to reduce flux loss through magnetic support structure (e.g. rotor poles 58). In the exemplary embodiment, distance f is greater than or equal to five times the length of air gap 72 (the gap between rotor outer edge 40 and stator inner edge 74), facilitating high flux generation. Alternatively, distance f is greater than or equal to three times the length of air gap 72. Alternatively still, distance f is greater than or equal to ten times the length of air gap 72. In the exemplary embodiment, distance f is maintained between protrusions 64. Alternatively, distance f is maintained between radial aperture walls 48 and 50 if no protrusions 64 are present, or between protrusion 64 and wall 48 or 50 if protrusion 64 is present on only one of walls 48 and 50.

Figure 6:
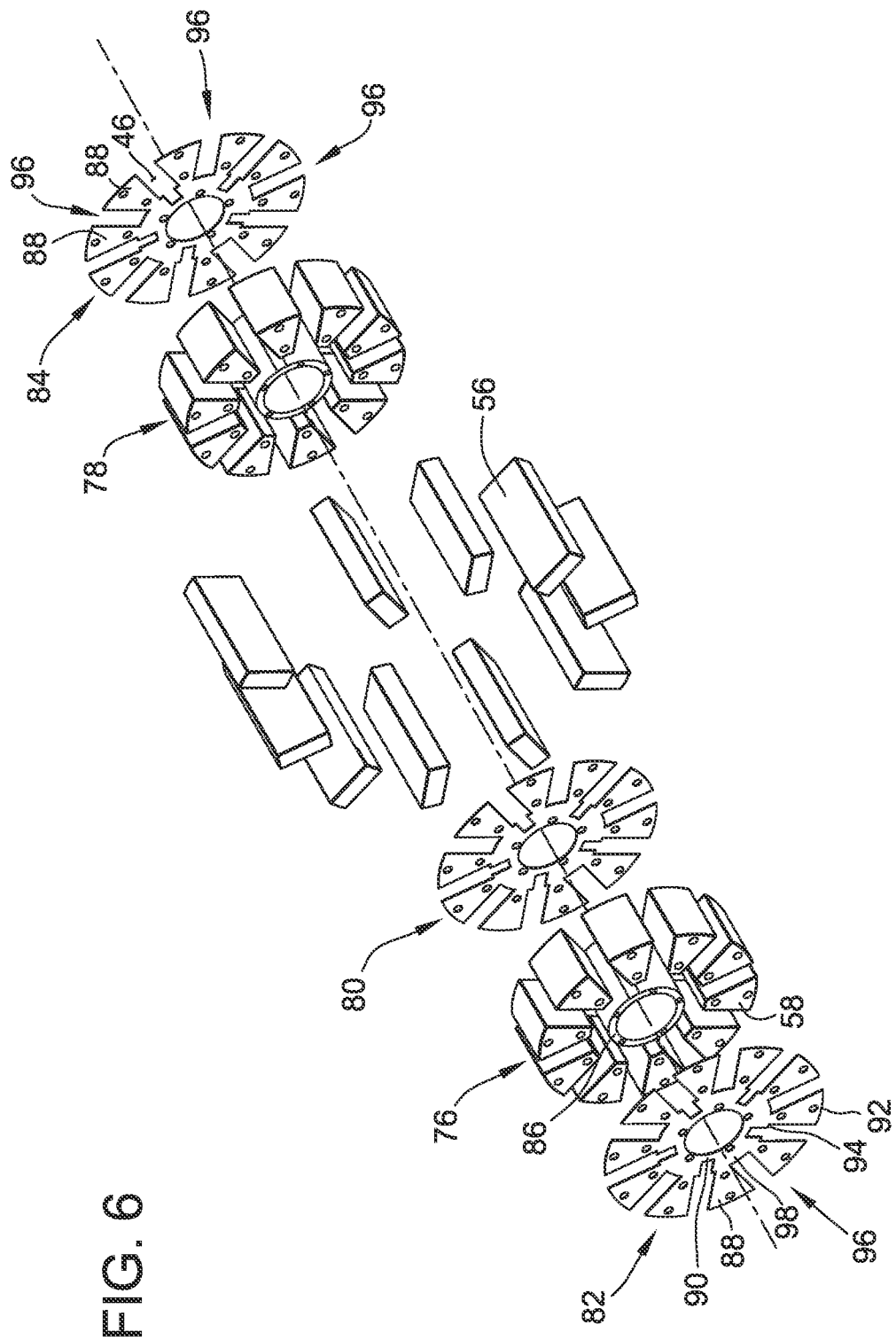
FIG. 6 is an exploded view of another exemplary rotor core that may be included within the electric machine shown in FIG. 1.

FIG. 6 is an exploded view of another exemplary embodiment of rotor core 36 that may be included within electric motor 10. In the exemplary embodiment, rotor core 36 includes a first half-core 76, a second half-core 78, a center lamination 80, and first and second end laminations 82 and 84. Half-cores 76 and 78 each include a plurality of independent rotor poles 58 positioned radially about a sleeve 86. A plurality of radial apertures 46 are defined between rotor poles 58 and are configured to receive one or more permanent magnets 56. Each rotor pole 58 is held in spaced relation to sleeve 86 by at least one of center lamination 80 and end laminations 82 and 84. In the exemplary embodiment, laminations 80, 82 and 84, also referred to as shorting laminations, are structurally similar, and each includes a plurality of connected rotor poles 88 positioned radially about a central hub 90. Rotor poles 88 each include an outer edge 92 and an inner edge 94. Adjacent pairs 96 of rotor poles 88 are connected at inner edges 94 by a bridge 98, which is connected to central hub 90.

In the exemplary embodiment, center lamination 80 is positioned between half-cores 76 and 78, and end laminations 82 and 84 are positioned on opposite ends of rotor core 36. In the exemplary embodiment, half-cores 76 and 78 are solid cores. Alternatively, half-cores 76 and 78 are formed as a whole core and/or are fabricated from a plurality of lamination layers. Although rotor core 36 is described with a single center lamination 80 and two end laminations 82 and 84, rotor core 36 may have any number of center and end laminations that enables motor 10 to function as described herein. Connected rotor poles 88 support rotor poles 58 at a distance from sleeve 86 to prevent flux losses in half-cores 76 and 78, since little or no magnetic material is located above or below magnets 56 positioned therein. A portion of flux generated by rotor core 36 is lost, however, due at least in part to connected rotor poles 88 of laminations 80, 82 and 84. In order to minimize flux losses, in the exemplary embodiment, the sum of the thicknesses of laminations having connected rotor poles 88 is less than or equal to 12% of the total length of rotor core 36. Alternatively, the sum of the thicknesses of laminations having connected rotor poles 88 is less than or equal to 2% of the total length of rotor core 36. Alternatively still, the sum of the thicknesses of laminations having connected rotor poles 88 is less than or equal to 1% of the total length of rotor core 36.

Figure 7:
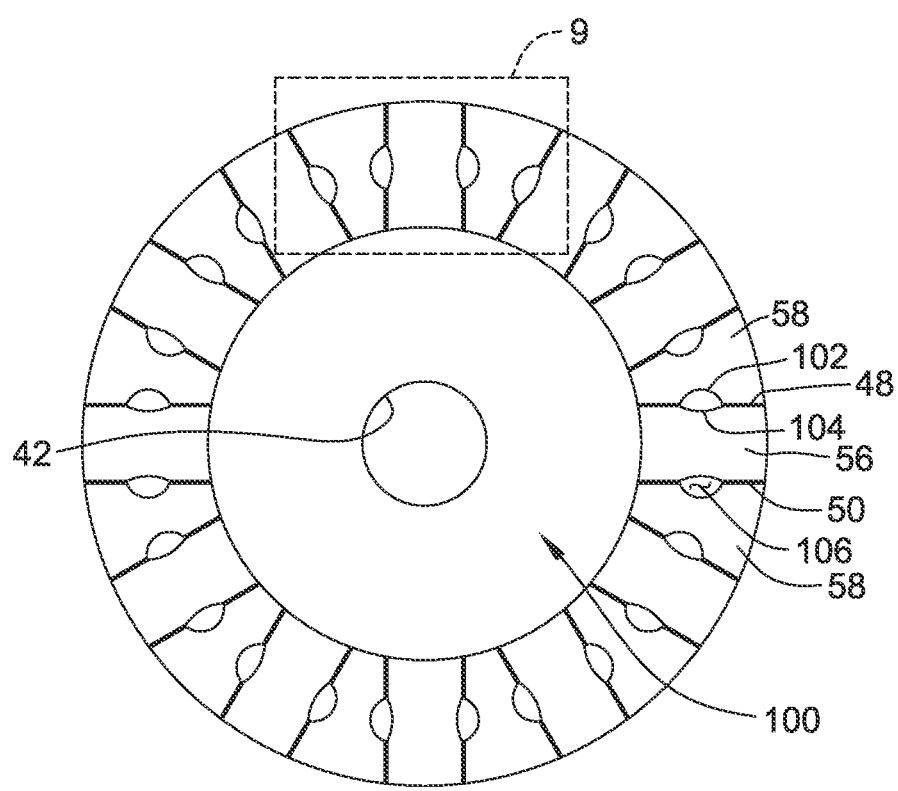
FIG. 7 is a front view of another exemplary rotor core that may be included within the electric machine shown in FIG. 1.
Figure 8:
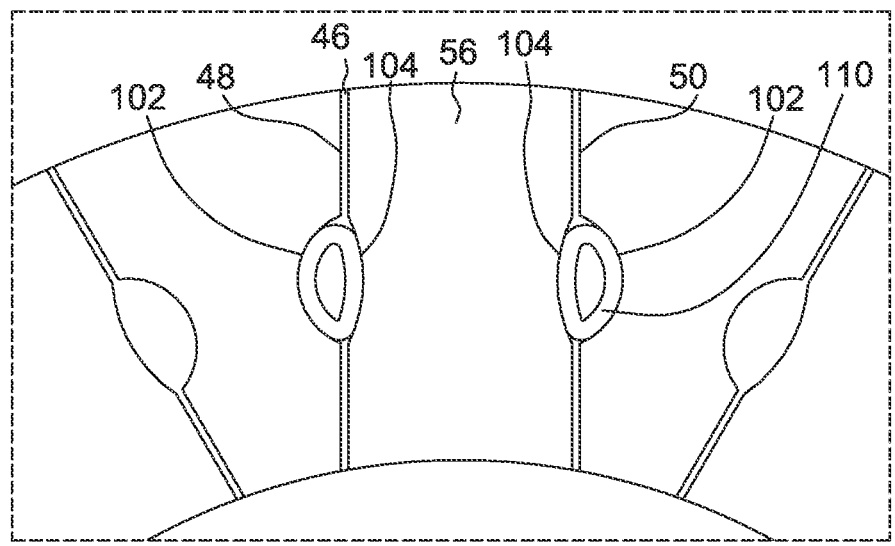
FIG. 8 is an expanded view of the rotor core shown in FIG. 7 with a retention material therein.
Figure 9:
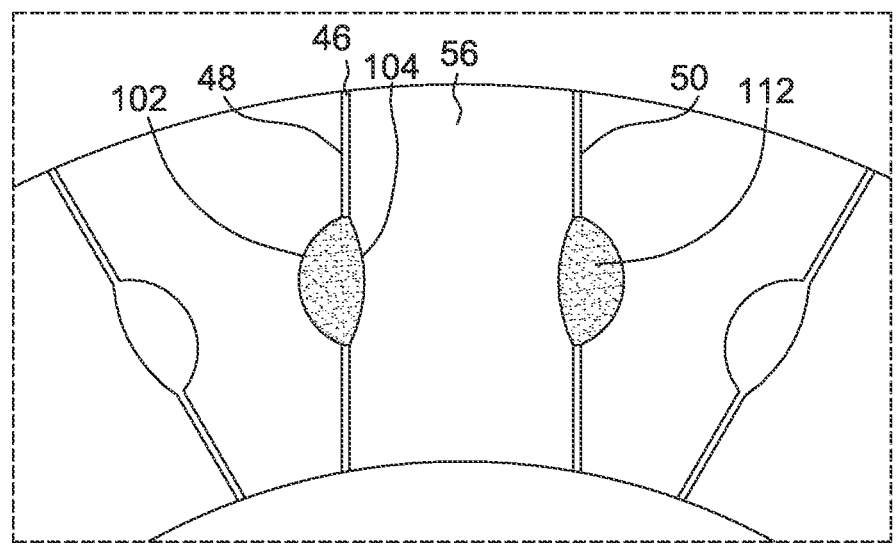
FIG. 9 is an expanded view of the rotor core shown in FIG. 7 with another retention material therein.

FIGS. 7-9 illustrate another exemplary embodiment of rotor core 36 that may be included within electric motor 10. FIG. 7 is a front view of rotor core 36 that includes a hub 100 defining an inner edge 42 sized to receive shaft 38, and a plurality of rotor poles 58 positioned radially about hub 100 defining a plurality of radial apertures 46, which are configured to receive one or more permanent magnet 56. In the exemplary embodiment, hub 100 is fabricated from aluminum and/or zinc and pressed directly onto shaft 38. Alternatively, hub 100 is fabricated from any non-magnetic material that enables rotor core 36 to function as described herein. In the exemplary embodiment, a first indentation 102 is formed in each of first wall 48 and second wall 50, and two second indentations 104 are formed in magnet 56. Alternatively, only one of indentation 102 and indentation 104 is formed, or any number and location of indentations 102 and 104 may be formed in walls 48 and 50 and magnet 56 that enables rotor 36 to function as described herein. Moreover, indentations 102 and 104 may have any suitable shape and size that enables rotor core 36 to function as described herein. For example, second indentation 104 may be smaller in size and/or have a smaller radius than first indentation 102.

In the exemplary embodiment, each first indentation 102 is substantially aligned with a corresponding second indentation 104 to define a space 106. Alternatively, first indentations 102 are formed without forming second indentations 104, and vice versa. Space 106 is configured to receive a retention material 108, which is configured to at least partially fill space 106 and cause interference between the surfaces of indentations 102 and 104 to substantially resist or prevent movement of magnet 56 within radial aperture 46. For example, retention material 108 frictionally engages the surfaces of indentations 102 and 104 and prevents magnet 56 from moving radially relative to radial aperture 46, which can result in unwanted noise or magnet dislocation. Further, retention material 108 is configured to prevent general side-to-side motion of magnet 56, which can occur due to tolerance stack-up and can result in unwanted noise from magnets 56 rattling against the faces of rotor poles 58. Retention material 108 may be formed from one segment or multiple segments and extend through the full length or through only a portion of rotor core 36.

In the exemplary embodiment, retention material 108 may be any material or member that at least partially fills space 106 and substantially prevents movement of magnet 56 within radial aperture 46. For example, as illustrated in FIG. 8, the retention material is a resilient hollow outer member 110 positioned within space 106. However, retention material 108 is not limited to a single material. For example, a hardened material member 111 may be inserted through hollow outer member 110 to facilitate additional interference between indentations 102 and 104. An alternative embodiment is shown in FIG. 9, which illustrates an expanding foam 112 as the retention material. Expanding foam 112 is deposited within space 106, and expands to engage the surfaces of indentations 102 and 104 and facilitate retention of magnet 56 within radial aperture 46. Alternatively, retention material 108 may be, for example, a pre-fabricated plastic or metal member (not shown), a formed in place member (not shown) such as with injection molded polymer, plastic or metal or an expanding material, a resilient member (not shown), an elastic member (not shown), a wedging member (not shown), a biasing mechanism such as a spring (not shown), or any combination thereof. Furthermore, retention material 108 may be used in place of, or in addition to, adhesives to retain magnet 56 within radial aperture 46.

Figure 10:
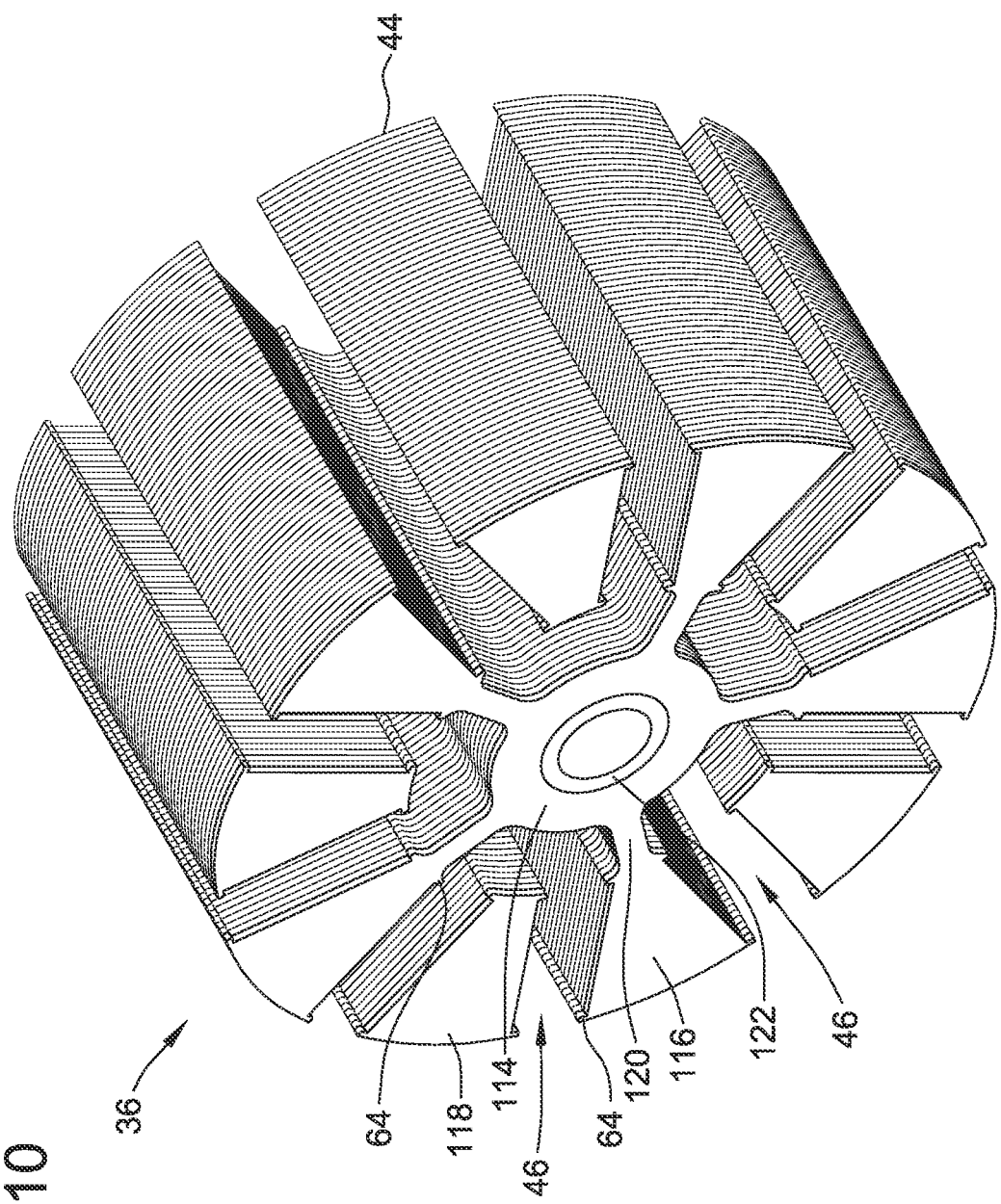
FIG. 10 is a perspective view of another exemplary rotor core that may be included within the electric machine shown in FIG. 1.
Figure 11:
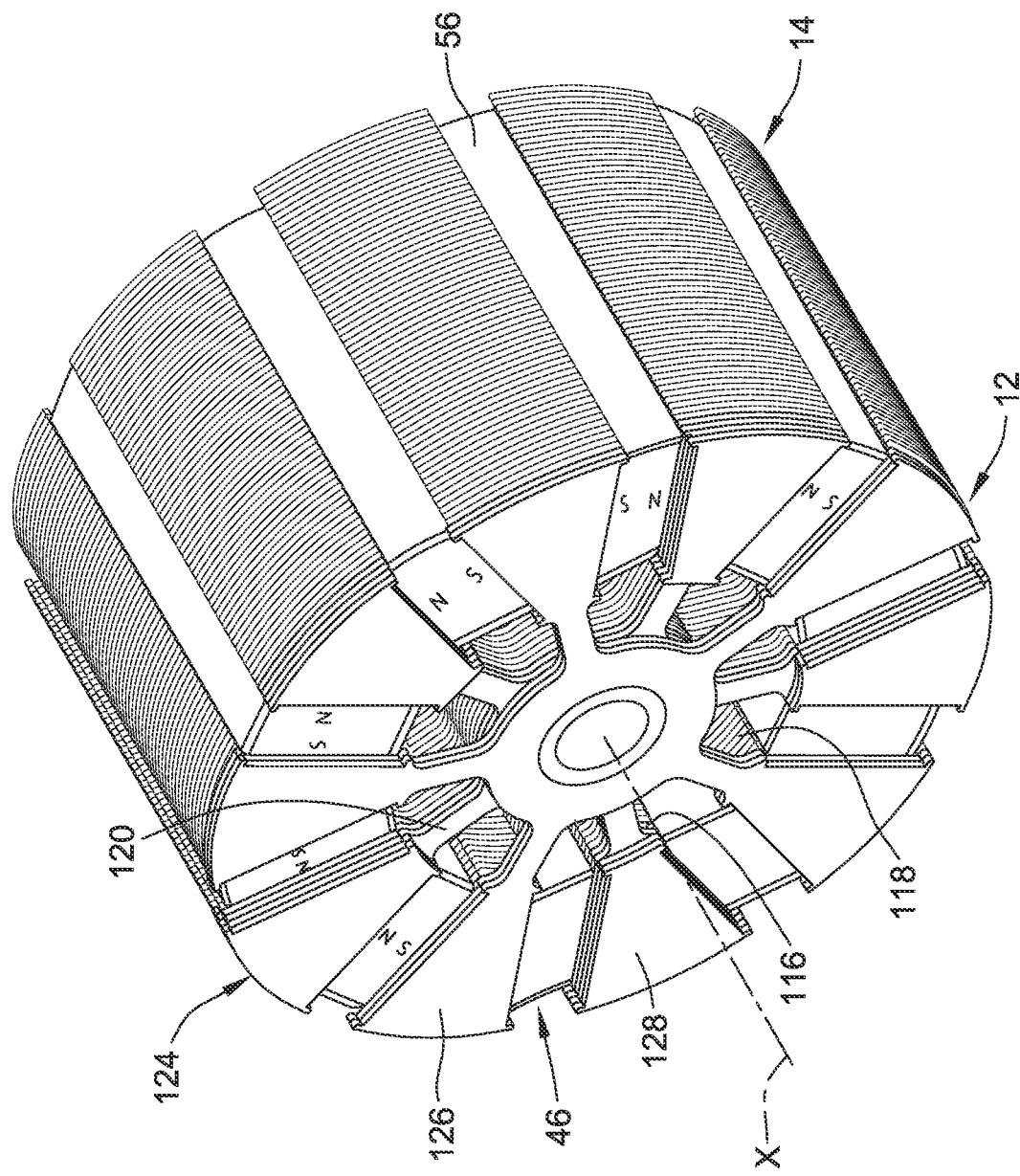
FIG. 11 is a perspective view of the rotor core of FIG. 10 with a rotated end lamination and permanent magnets.

FIG. 10 illustrates a perspective view of another exemplary embodiment of rotor core 36 that may be included within electric motor 10. In the exemplary embodiment, rotor core 36 is formed from a plurality of laminations 44 that each includes a hub 114, a plurality of connected rotor poles 116, and a plurality of independent rotor poles 118. Rotor poles 116 and 118 are positioned radially about hub 114. Each connected rotor pole 116 is coupled to hub 114 by a web 120. In the exemplary embodiment, a sleeve 122 fabricated from a non-magnetic material, for example aluminum, is positioned between hub 114 and shaft 38 to provide mechanical stability and prevent a magnetic path to shaft 38. Alternatively, sleeve 122 is excluded and/or shaft 38 is at least partially formed from a non-magnetic material to prevent a magnetic path thereto. Radial apertures 46 are defined between adjacent rotor poles 116 and 118 and are configured to receive one or more permanent magnet 56. Rotor poles 116 and 118 also include magnet retention features 64 configured to retain magnet 56 within radial aperture 46, as described above. Illustrated in FIG. 11, one or more laminations 124 are rotated to support independent rotor poles 118 in spaced relation to hub 114. Each rotated lamination 124 includes a plurality of connected rotor poles 126 and independent rotor poles 128. Rotated lamination 124 is oriented or rotated in a clockwise or counterclockwise direction by one pole such that each connected rotor pole 126 is aligned with and supports one independent rotor pole 118, and each independent rotor pole 128 is aligned and supported by one connected rotor pole 116.

In the exemplary embodiment, two rotated laminations 124 are positioned on rotor first end 12. Additionally, one or more rotated laminations 124 are positioned on rotor second end 14. However, any number of rotated laminations 124 may be positioned anywhere throughout the stack of laminations 44 that enables rotor core 36 to function as described herein. For example, rotated lamination 124 may be located substantially within the center of the lamination stack of rotor core 36. In the exemplary embodiment, rotated lamination 124 is fabricated from steel. Alternatively, rotated lamination 124 is formed from any non-magnetic material such as aluminum or molded plastic.

In the exemplary embodiment, each permanent magnet 56 is positioned within one radial aperture 46 by inserting magnet 56 therethrough in an axial direction parallel to axis X. Alternatively, each permanent magnet 56 is inserted into one radial aperture 46 in a direction radial to hub 114, for example, when protrusions 64 are not present on outer edge 40. Each permanent magnet 56 includes a first polarity pole N and a second polarity pole S. In the exemplary embodiment, magnets 56 are arranged within radial aperture 46 such that each pole N faces one connected rotor pole 116 and each pole S faces one independent rotor pole 118. This arrangement results in little or no flux leakage because each rotor pole 116 and 118 is only in contact with the same magnetic polarity. Alternatively, magnets 56 are arranged such that each pole S faces one connected rotor pole 116 and each pole N faces one independent rotor pole 118.

Figure 12:
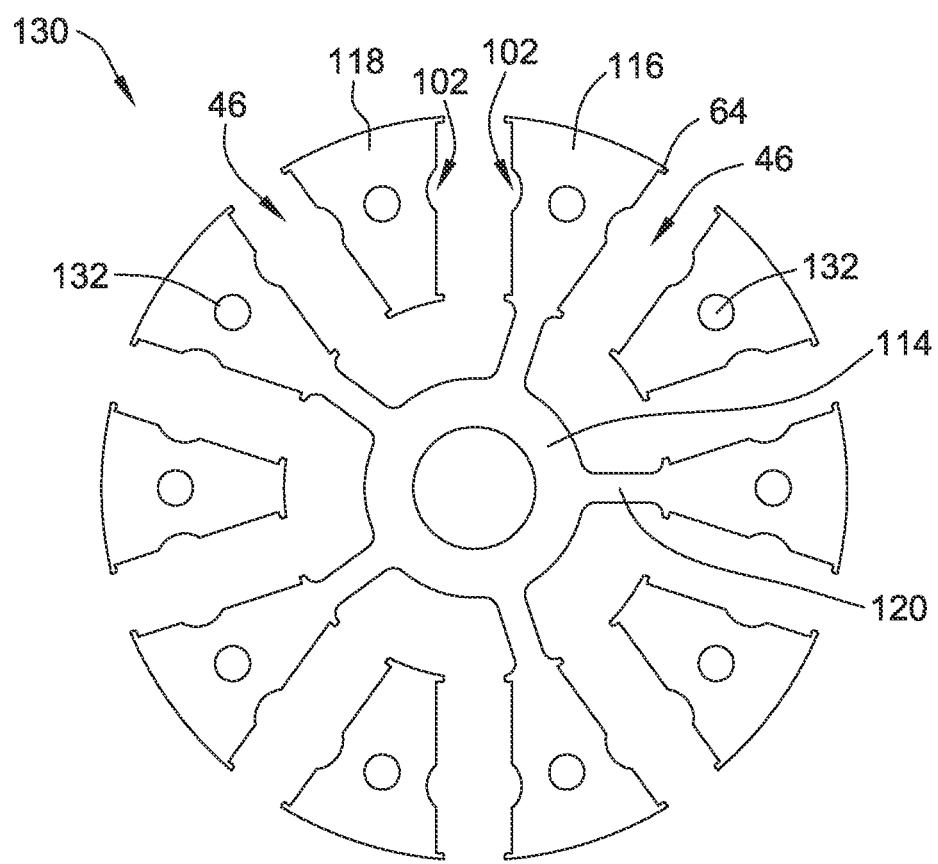
FIG. 12 is a front view of an exemplary lamination that may be included with the rotor core shown in FIG. 10.
Figure 13:
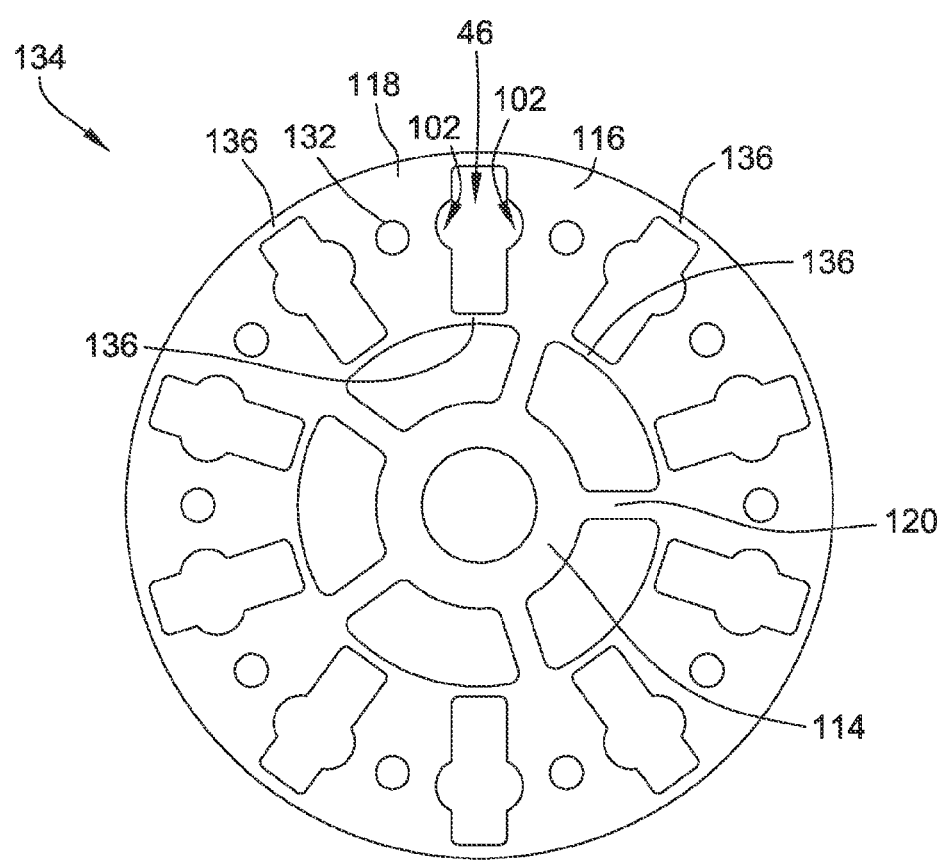
FIG. 13 is a front view of another exemplary lamination that may be included with the rotor core shown in FIG. 10.
Figure 14:
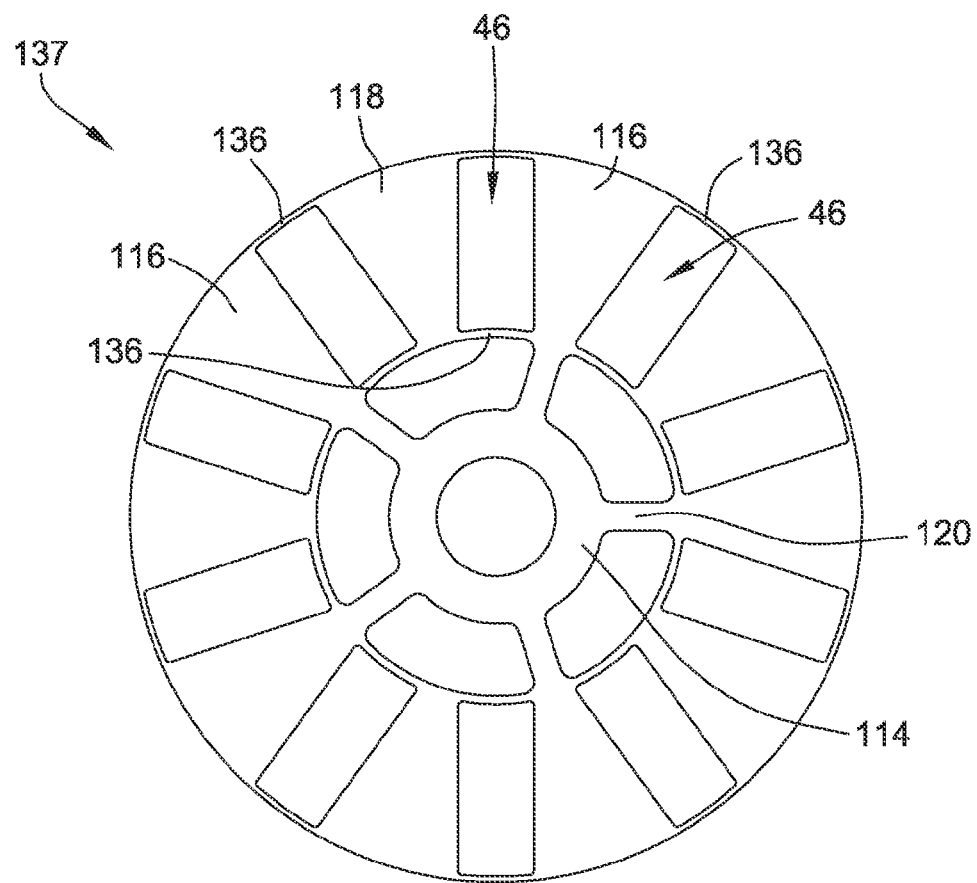
FIG. 14 is a front view of another exemplary lamination that may be included with the rotor core shown in FIG. 10.

FIGS. 12-14 illustrate alternate exemplary embodiments of laminations 44 positioned on rotor ends 12 and 14 or anywhere throughout laminated rotor core 36. For example, FIG. 12 illustrates a front view of a lamination 130 that is similar to lamination 124 illustrated in FIG. 10, except lamination 130 includes apertures 132 and indentations 102 formed in connected rotor poles 116 and independent rotor poles 118. Indentations 102 are configured to align with indentations 104 formed in magnets 56 to define a space 106, which is configured to receive a retention material 108, as described above. Apertures 132 are configured to receive fasteners (not shown) to facilitate aligning and coupling multiple laminations 130. FIG. 13 illustrates a front view of a lamination 134 that is similar to lamination 130, except connected rotor poles 116 and independent rotor poles 118 are connected by bridges 136. FIG. 14 illustrates a front view of a lamination 137 that is similar to lamination 134, except lamination 137 excludes indentations 102 and apertures 132. Moreover, when used as end laminations, the laminations described above may include radial apertures 46 sized smaller than magnets 56 to prevent magnet 56 from sliding out a rotor end during axial insertion of magnet 56.

Figure 15:
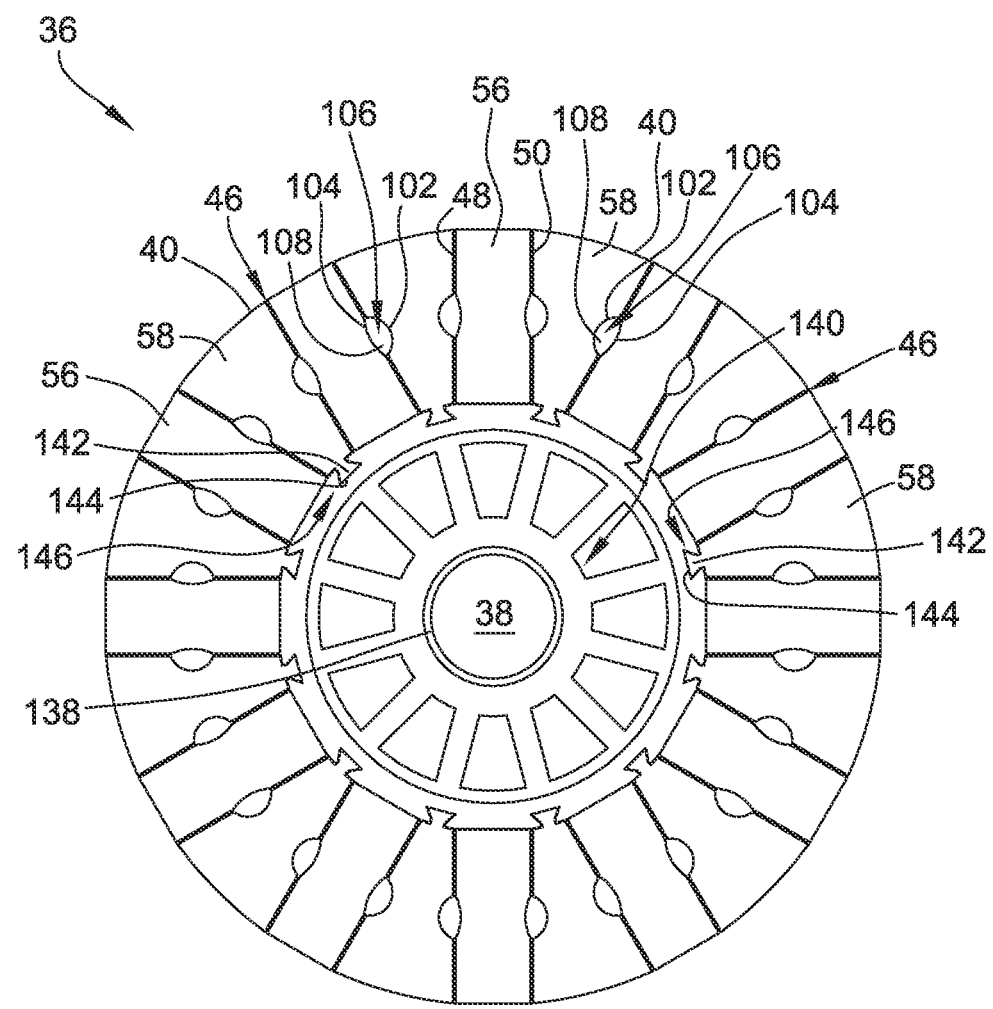
FIG. 15 is a front view of another exemplary rotor core that may be included within the electric machine shown in FIG. 1.

FIG. 15 is a front view of another exemplary embodiment of rotor core 36 that may be included within electric motor 10. In the exemplary embodiment, rotor core 36 includes a sleeve 138 configured to receive shaft 38, a central hub 140, and a plurality of rotor poles 58 positioned radially about central hub 140. Rotor poles 58 are solid or laminated and define a plurality of radial apertures 46 therebetween, which are configured to receive one or more permanent magnet 56. Rotor poles 58 include indentations 102 that are substantially aligned with indentations 104 in permanent magnets 56 to form a space 106. Each rotor pole 58 includes a protrusion 142 that extends into a recess 144 formed in central hub 140. Each protrusion 142 and corresponding recess 144 forms an interlock 146. In the exemplary embodiment, interlock 146 is a dovetail joint configured to facilitate increased torque transmission between rotor poles 58 and central hub 140. Alternatively, interlock 146 may have any geometry that enables rotor core 36 to function as described herein.

In the exemplary embodiment, radial aperture 46 includes first and second walls 48 and 50 defined by rotor poles 58. A retention material 108 is positioned within radial aperture 46 and space 106 between magnet 56 and first and second walls 48 and 50. An annular end plate (not shown) is positioned on rotor core ends. In the exemplary embodiment, retention material 108 is an injection molded polymer. However, retention material 108 may be any suitable material that enables rotor core 36 to function as described herein. Additionally, retention material 108 may be positioned between magnet 56 and an outer edge 40 of rotor core 36. In the exemplary embodiment, sleeve 138 and rotor poles 58 are fabricated from steel. However, sleeve 138 and rotor poles 58 may be formed from any suitable material that enables rotor core 36 to function as described herein. Alternatively, sleeve 138 may be excluded and central hub 140 is directly coupled to shaft 38. In the exemplary embodiment, central hub 140 is fabricated from an injection molded polymer. However, central hub 140 may be formed from any suitable non-magnetic material that enables rotor core 36 to function as described herein. For example, central hub 140 may be a machined, extruded or die cast non-magnetic material such as aluminum or zinc. Alternatively, central hub 140 is fabricated from an isolation damping material configured to reduce transmission of at least one of motor torque pulsations, motor torque ripple, and motor torque cogging.

An exemplary method of manufacturing rotor core 36 is described herein. Sleeve 138, rotor poles 58 and permanent magnets 56 are located substantially symmetrically in a mold (not shown). Alternatively, sleeve 138 may be excluded. Rotor poles 58 and sleeve 138 are a solid structure or laminated structure held together with interlocks, rivets, bolts, and/or other fasteners. In the exemplary embodiment, preformed magnets 56 are inserted into radial apertures 46 defined between rotor poles 58. Alternatively, a polymer bonded magnet material is injected into the radial apertures 46 to form permanent magnets 56. In the exemplary embodiment, a non-magnetic polymer is injection molded into the region between rotor poles 58 and magnets 56, in the region between magnets 56 and rotor outer edge 40, and in spaces 106 defined by indentations 102 and 104. The polymer is further injection molded in the region between sleeve 138 and rotor poles 58 and magnets 56 to form central hub 140. In this way, the injection molding process magnetically isolates rotor poles 58 and magnets 56 on the outer diameter of rotor 36 and orients rotor poles 58 and magnets 56 at a predetermined diameter equal to a desired rotor outer diameter. Magnets 56 may be magnetized before insertion into the mold or may be magnetized after the molding process. Alternatively, central hub 140 is a pre-formed non-magnetic material, for example zinc or aluminum, that is inserted into the mold after magnets 56 are installed and magnetized. An annular end plate (not shown) is then positioned on rotor core ends. Alternatively, sleeve 138 and rotor poles 58 are located substantially symmetrically in the mold. A high strength polymer material with a high first processing temperature (e.g. glass-filled Rynite material) is injection molded in the region between sleeve 138 and rotor poles 58 to form central hub 140. The processing temperature is the temperature at which a material can be processed in a conventional injection molding process and is above the higher of the melting point and the glass transition temperature. Permanent magnets 56 are then inserted into radial apertures 46 defined between rotor poles 58, and a polymer material with a lower second processing temperature (e.g. glass-filled Crastin) is molded in the remaining space around magnets 56. This two-step molding process prevents performing the high temperature material injection while magnets 56 are in the mold, which may reduce the effectiveness of magnets 56.

Figure 16:
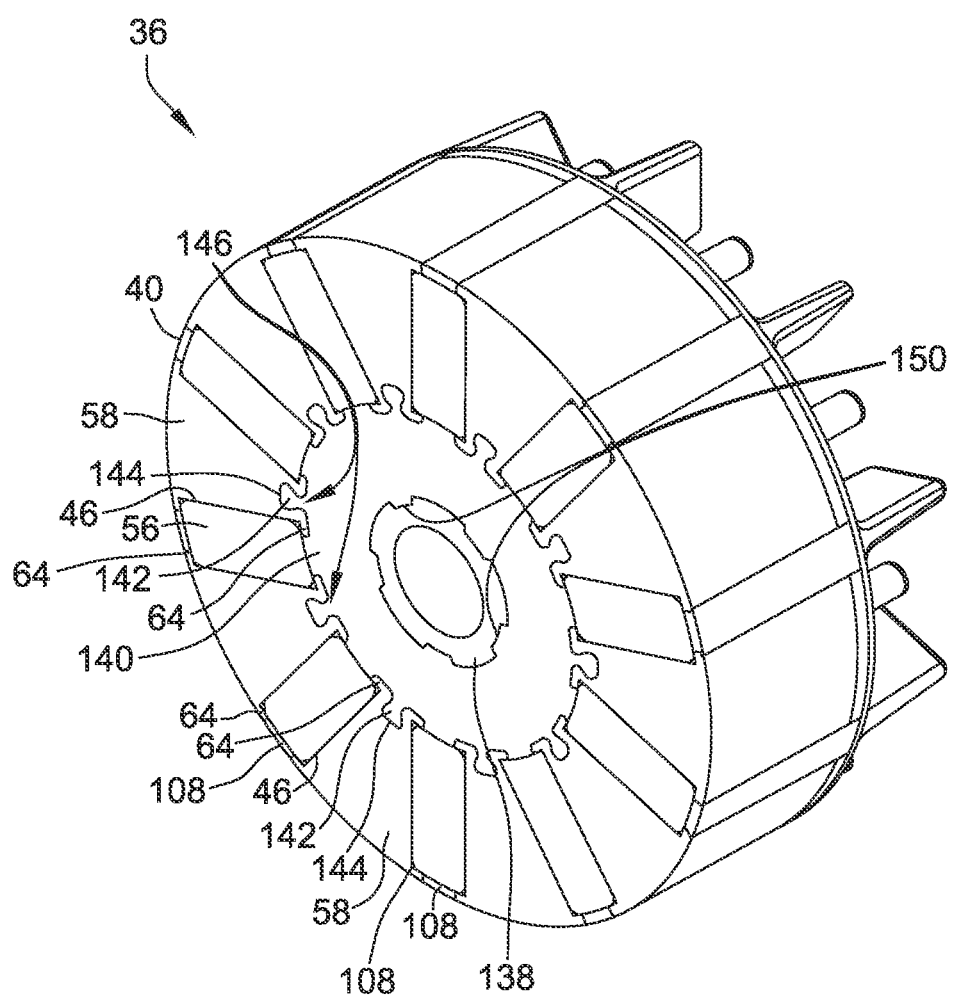
FIG. 16 is a perspective sectional view of another exemplary rotor core that may be included within the electric machine shown in FIG. 1.

FIG. 16 is a section view of another exemplary embodiment of rotor core 36 that may be included within electric motor 10. In the exemplary embodiment, rotor core 36 includes a sleeve 138 configured to receive shaft 38, a central hub 140, and a plurality of rotor poles 58 positioned radially about central hub 140. Sleeve 138 includes indentations 150 to provide an interlock with central hub 140 to facilitate increased torque transmission therebetween. In the exemplary embodiment, hub 140 is solid. Alternatively, hub 140 is fabricated with apertures 152 (see FIG. 17). Rotor poles 58 are a solid or laminated structure and define a plurality of radial apertures 46, which are configured to receive one or more permanent magnets 56. Rotor poles 58 include protrusions 64, which are configured to retain magnets 56 within radial apertures 46, as described above. Each rotor pole 58 includes a recess 144 that receives protrusion 142 extending from central hub 140. Each protrusion 142 and corresponding recess 144 forms an interlock 146, which is configured to facilitate increased torque transmission between rotor poles 58 and central hub 140. In an alternate embodiment, interlock 146 may have any geometry that enables rotor core 36 to function as described herein. Alternatively, rotor poles 58 are coupled to central hub 140 in any manner that enables torque transmission between rotor poles 58 and central hub 140, for example, by adhesives, mechanical fasteners, etc.

Figure 17:
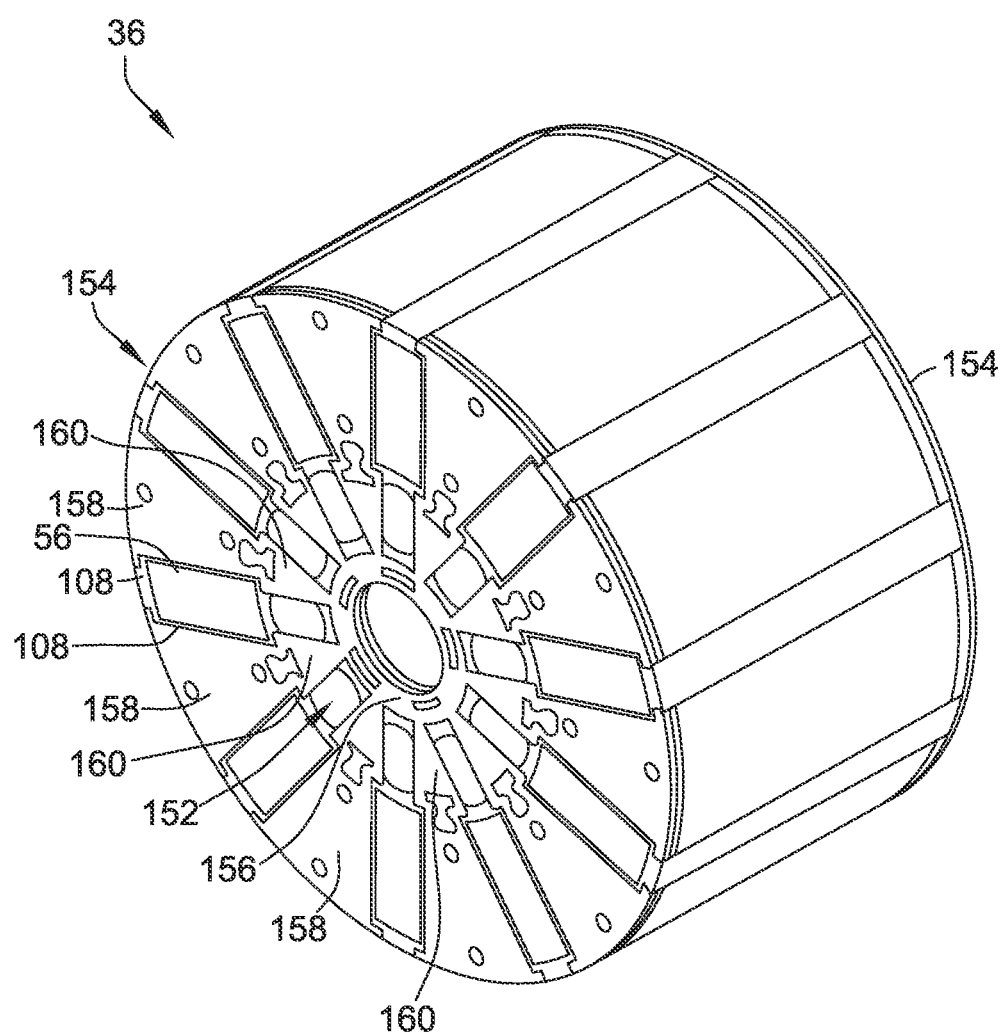
FIG. 17 is a perspective view of another exemplary rotor core that may be included within the electric machine shown in FIG. 1.
Figure 18:
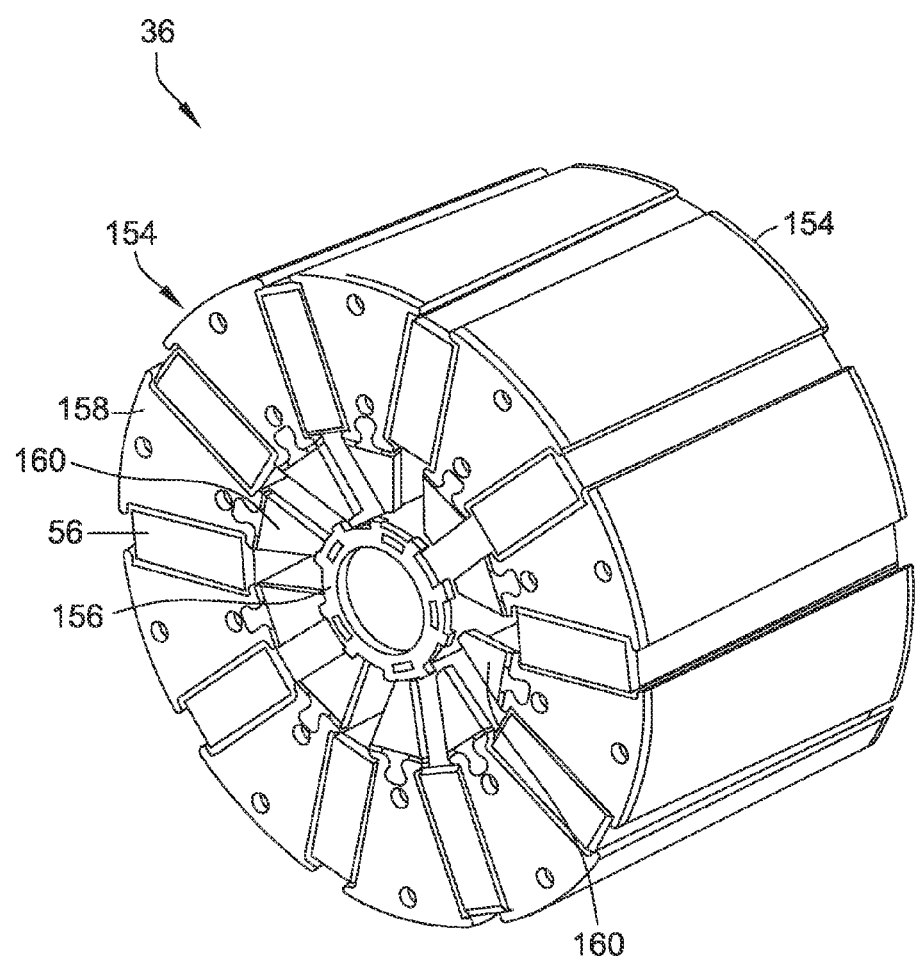
FIG. 18 is a perspective view of the rotor core shown in FIG. 17 with webs mechanically disconnected.

In the exemplary embodiment, radial aperture 46 receives one or more magnet 56 and a retention material 108 is positioned within radial aperture 46 between magnet 56 and rotor outer edge 40. As illustrated in FIG. 17, one or more end laminations 154 are positioned on rotor ends 12 and 14. In the exemplary embodiment, each end lamination 154 includes a hub 156 connected to a plurality of rotor poles 158 by webs 160. Alternatively, since webs 160 provide a magnetic path through the rotor and between rotor poles 158, which results in some flux leakage, webs 160 may be mechanically disconnected or sheared from hub 156 (see FIG. 18) and then molded over when forming hub 156. Mechanically disconnecting webs 160 provides resiliency between the rotor outer diameter and hub 140, which reduces torque pulsations, vibration, noise and undesirable cogging torque and/or ripple torque. Alternatively, one or more bridges (not shown) are formed between adjacent rotor poles 158 along rotor outer diameter 40 and/or anywhere along radial apertures 46. As such, the bridges of end lamination 154 secure rotor core 36 and increase rigidity during punch and interlock, stacking, and/or transport. Once rotor core 36 is formed, the bridges may be mechanically disconnected for plastic molding, potting and/or epoxy filling operations.

An exemplary method of manufacturing rotor core 36 is described herein. Rotor core 36 is fabricated by punching multiple interlocked laminations that each includes a sleeve 138 and a plurality of rotor poles 58. The laminations are stacked and may or may not be indexed to reduce rotor imbalances. One or more magnets 56 are positioned radially about sleeve 138 between rotor poles 58 by inserting each magnet 56 axially and/or radially into radial aperture 46. One or more end laminations 154 are positioned on rotor core end 12 and/or 14, and rotor core 36 is located in a mold (not shown). Optionally, a plurality of rotor poles 158 of end lamination 154 may be mechanically disconnected from a hub 156 by breaking or shearing webs 160. A non-magnetic polymer is injection molded into the region between rotor poles 58 and magnets 56, in the region between magnets 56 and rotor outer edge 40, and in the region between sleeve 138 and rotor poles 58 and magnets 56 to form central hub 140. The polymer may also be injection molded over mechanically disconnected webs 160. In this way, the injection molding process magnetically isolates rotor poles 58 and magnets 56 on the outer diameter of rotor 36 and orients rotor poles 58 and magnets 56 at a predetermined diameter equal to a desired rotor outer diameter. Magnets 56 may be magnetized before insertion into the mold, or may be magnetized during or after the molding process. End lamination 154 may be coupled to rotor core 36 before, during or after the molding process.

Figure 19:
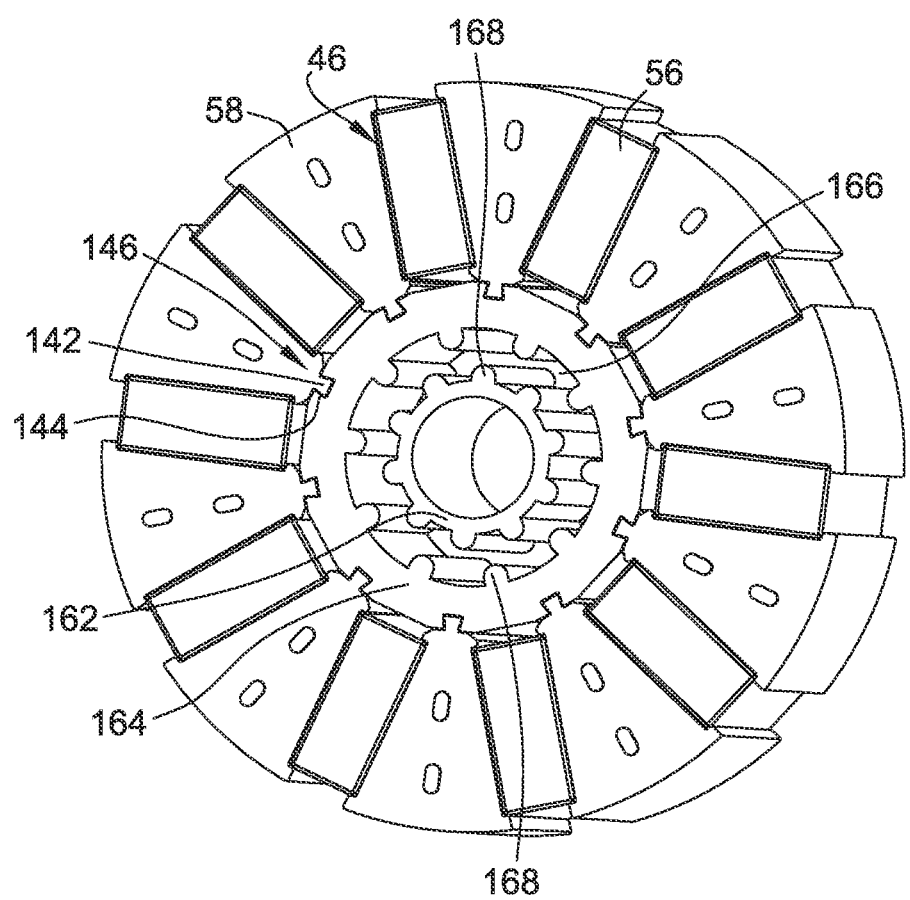
FIG. 19 is a perspective view of another exemplary rotor core that may be included within the electric machine shown in FIG. 1.

FIG. 19 is a section view of another exemplary embodiment of rotor core 36 that may be included within electric motor 10. In the exemplary embodiment, rotor core 36 includes an inner hub 162 configured to receive shaft 38, an outer hub 164, and a plurality of rotor poles 58 positioned radially about outer hub 164. Rotor poles 58 are solid or laminated and define a plurality of radial apertures 46 therebetween, which are configured to receive one or more permanent magnet 56. Each rotor pole 58 includes a protrusion 142 that extends into a recess 144 in outer hub 164 to form an interlock 146. In the exemplary embodiment, interlock 146 is a dovetail joint configured to facilitate increased torque transmission between rotor poles 58 and outer hub 164.

In the exemplary embodiment, radial aperture 46 receives one or more permanent magnet 56. A molded material (e.g. injection molded polymer) may be positioned within radial aperture 46 between magnet 56 and rotor outer edge 40 and between magnet 56 and outer hub 164. Similarly, the material is positioned in a space 166 between outer hub 164 and inner hub 162 to form a central hub (not shown). Inner and outer hubs 162 and 164 each include protrusions 168, which facilitate increased torque transmission therebetween. In the exemplary embodiment, inner and outer hubs 162 and 164 are fabricated from a non-magnetic material (e.g. aluminum). Alternatively, hubs 162 and 164 are fabricated from any non-magnetic material that enables rotor 36 to function as described herein. Alternatively, inner hub 162 is fabricated from a magnetic material.

An exemplary method of manufacturing rotor core 36 is described herein. Inner hub 162, outer hub 164, rotor poles 58 and magnets 56 are located substantially symmetrically in a mold (not shown). Rotor poles 58 and hubs 162 and 164 are a solid structure or a laminated structure held together with interlocks, rivets, bolts, and/or other fasteners. Magnets 56 are inserted into radial apertures 46 or a magnetic material is injected therein to form magnets 56. A non-magnetic polymer is injection molded into space 166 between outer hub 164 and inner hub 162, between rotor outer edge 40 and magnet 56, and between magnet 56 and outer hub 164. In this way, rotor poles 58 and magnets 56 are magnetically isolated on the outer diameter of rotor 36 and rotor poles 58 and magnets 56 are oriented at a predetermined diameter equal to a desired rotor diameter. Magnets 56 may be magnetized before insertion into the mold or may be magnetized after the molding process. Alternatively, rotor poles 58 and hubs 162 and 164 are located in the mold and a high-strength material with a high first processing temperature is injection molded in space 166 to form a central hub. Permanent magnets 56 are then inserted into radial apertures 46 defined between rotor poles 58, and a lower second processing temperature material is molded in the remaining space around magnets 56. This two-step molding process prevents performing the high processing temperature material injection while magnets 56 are in the mold, which may reduce the effectiveness of magnets 56.

In the embodiments described above, electric motor 10 includes stator core 28, which includes windings 32. Typically, windings 32 are fabricated from copper, which makes up a significant part of the motor material cost. In one exemplary embodiment, windings 32 are formed from aluminum instead of copper. However, aluminum has approximately 60% of the resistivity of copper and lowers motor efficiency. One way to reduce the loss of efficiency is to increase the length of stator core 28 and rotor core 36. However, increased motor length is undesirable from a material cost standpoint as well as an application standpoint (e.g. the longer motor may not fit in a desired user application). In order to reduce or recover the efficiency loss associated with aluminum windings while minimizing an increase in the length of motor 10, radially embedded permanent magnet rotor 36 described above is used. Radially embedded permanent magnet rotor 36 generates more flux than other common rotor designs using ferrite magnets. Radially embedded permanent magnet rotor 36 results in increased torque, which makes up for the loss in efficiency.

Figure 20:
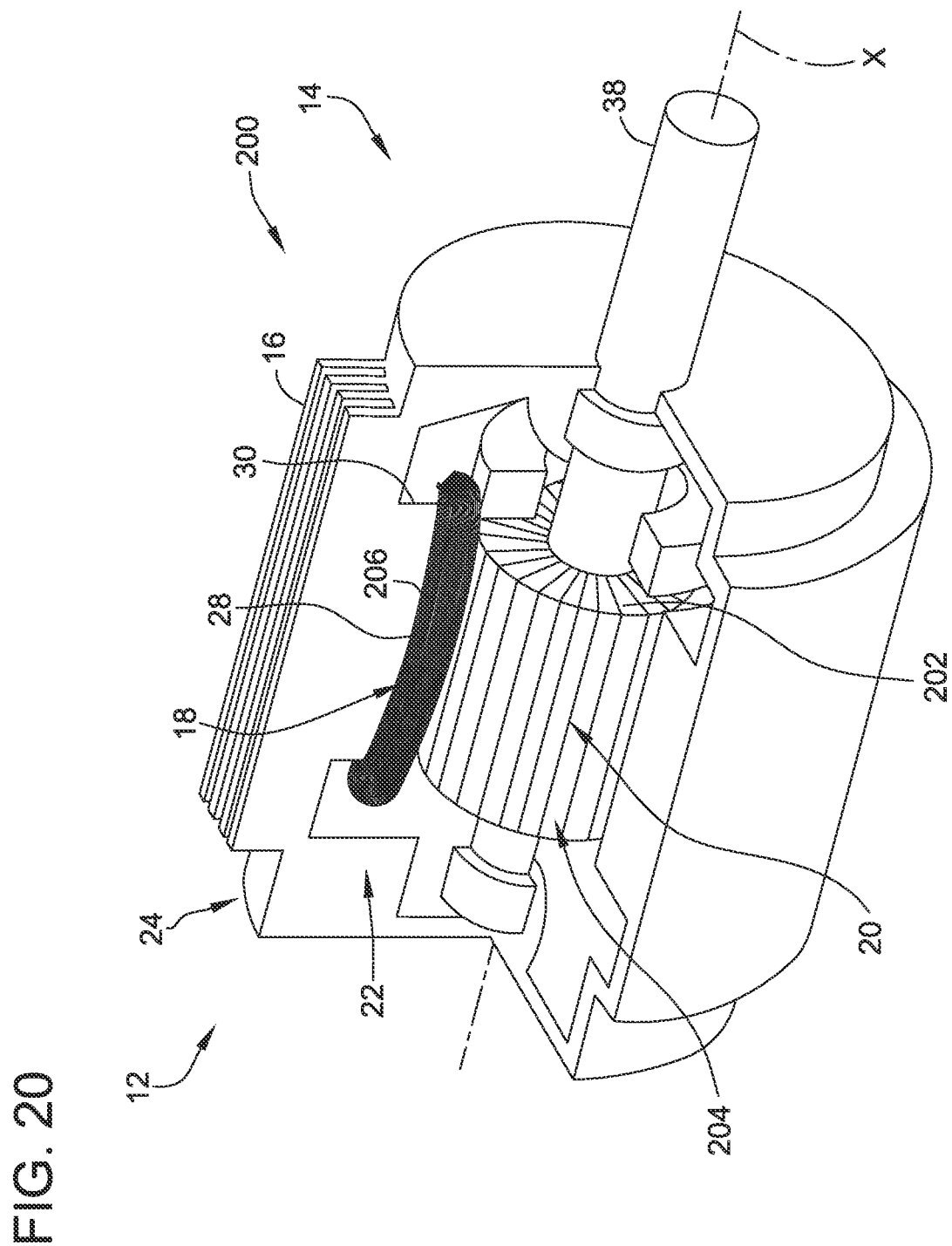
FIG. 20 is a perspective cut-away view of another exemplary electric machine.

FIG. 20 illustrates another exemplary electric motor 200 that is similar to electric motor 10, except electric motor 200 includes a rotor 202 having a different magnet arrangement than rotor core 36 above. In electric motor designs having rotor cores without radially embedded permanent magnets (e.g. surface mounted magnet rotors), motor efficiency is also reduced when copper windings are replaced with aluminum windings 32. In order to overcome efficiency loss, electric motor 200 includes one or more permanent magnet 204 and aluminum windings 206. In the exemplary embodiment, permanent magnet 204 is fabricated from a higher grade ferrite material that has remnance (Br) magnetic flux density higher than about 0.40 Tesla (about 4 K Gauss). Alternatively, permanent magnet 204 is fabricated from any material that enables electric motor 200 to increase flux density while using lower-cost materials.

Figure 21:
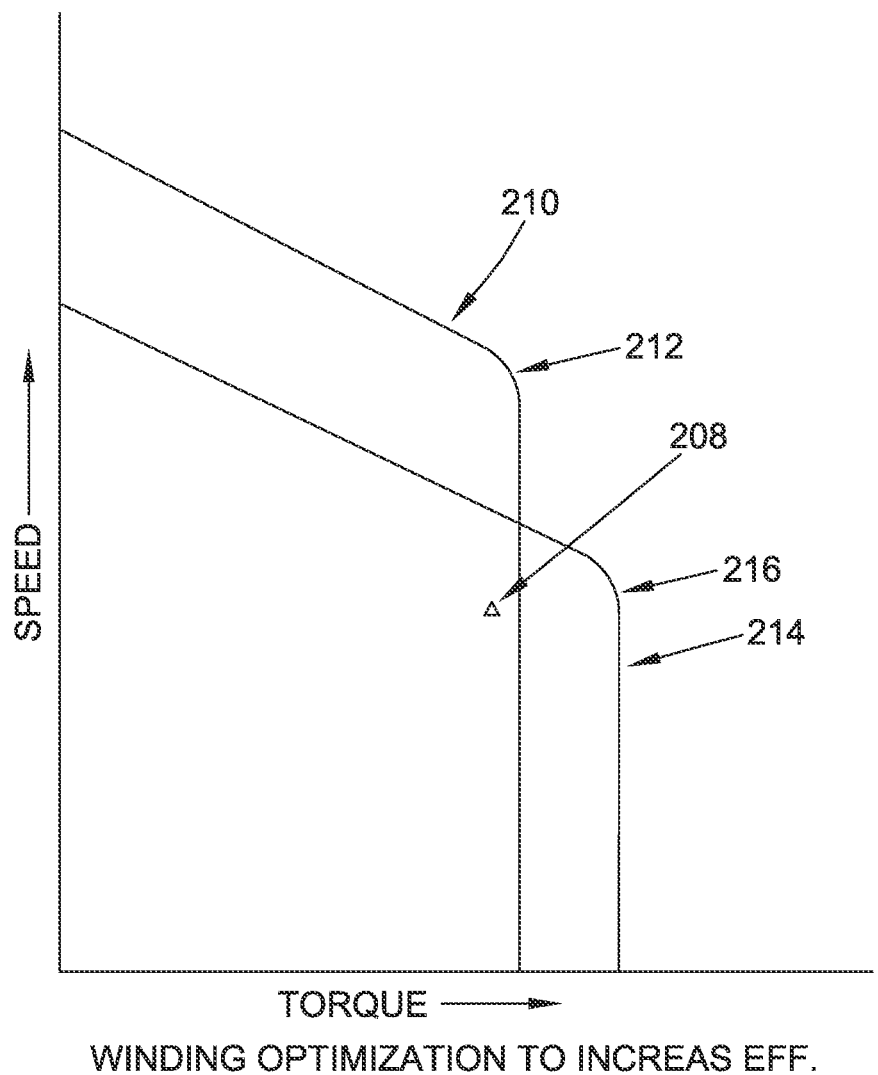
FIG. 21 is a chart plotting motor speed and torque values.

Moreover, in the exemplary embodiment, windings 206 are designed or optimized so that the knee of the speed-torque curve of motor 200 is operating at substantially the full load operating point required by motor 200 for a desired application. The knee of the speed-torque curve is the motor speed at which the motor transitions from the voltage control region to the current control region. FIG. 21 illustrates an exemplary plot of speed and torque for motor 200. The desired full load operating point is represented by point 208. Line 210 plots the speed-torque curve of an electric motor without optimized windings. Point 212 represents the knee of the speed-torque curve of line 210. Line 214 plots the speed-torque curve of electric motor 200 with optimized windings 206. Point 216 represents the knee of the speed-torque curve of line 214. In the exemplary embodiment, knee 216 of the curve is dropped closer to full load operating point 208 by adding more turns in windings 206. By use of magnets 204 and/or optimized winding design of windings 206, electric motor 200 is configured to recover all or at least a portion of the efficiency losses due to fabricating windings 206 from aluminum, without increasing the length of electric motor 200.

Figure 22:
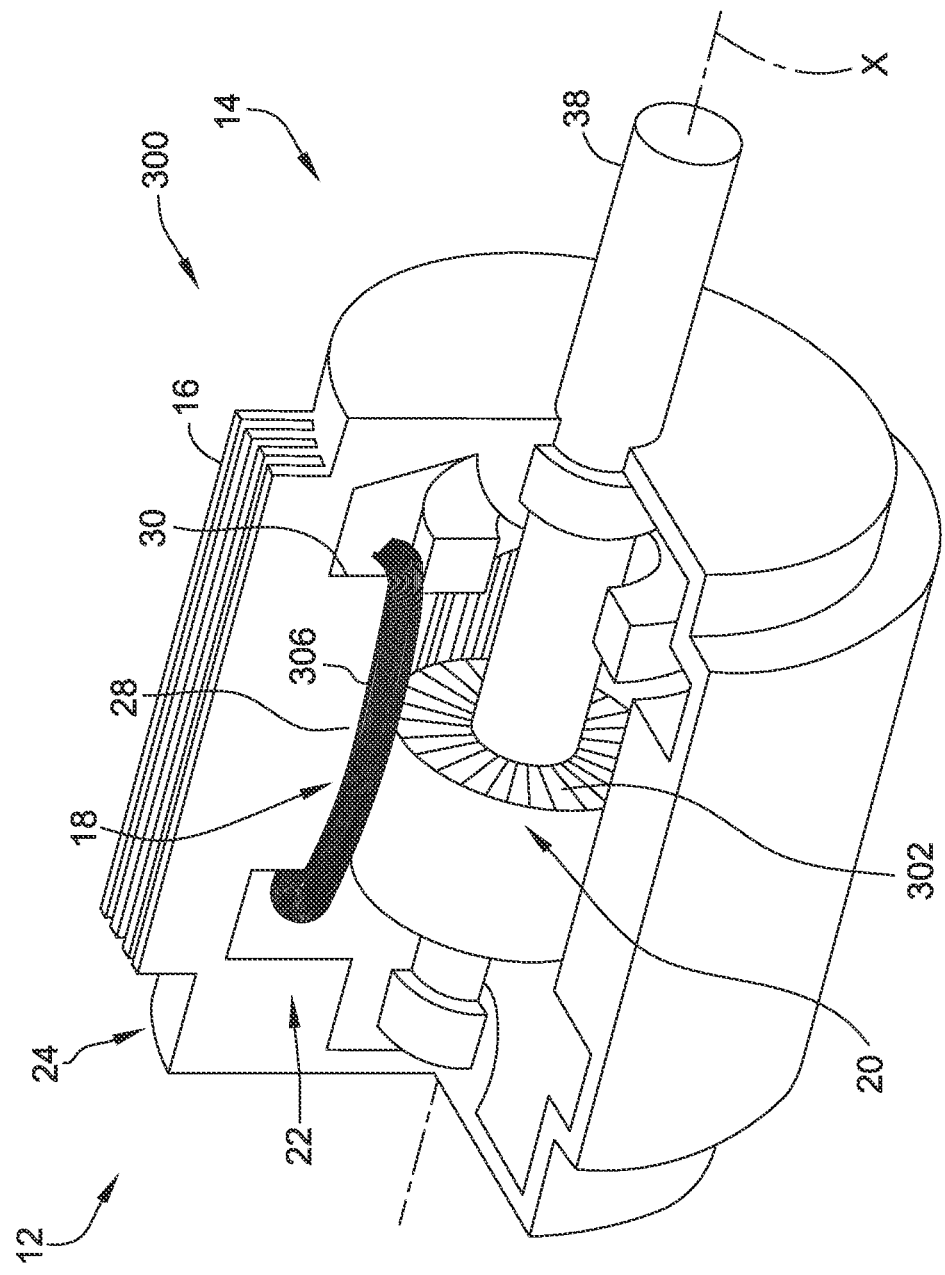
FIG. 22 is a perspective cut-away view of another exemplary electric machine.

FIG. 22 illustrates another exemplary electric motor 300 that is similar to electric motors 10 and 200, except electric motor 300 includes a modified rotor 302 and windings 306. In the exemplary embodiment, modified rotor 302 is a radially embedded permanent magnets rotor and replaces an original rotor (not shown). Alternatively, modified rotor 302 is a surface mounted permanent magnet rotor or an internal permanent magnet rotor. Motor 300 is a motor platform that is designed for operation at a typical design speed, which is the normal operating speed of a motor for a given rotor/stator construction. However, in the exemplary embodiment, motor 300 is desired to operate at a higher speed. Operation of motor 300 with the original rotor at the higher speed generates increased frequency, resulting in increased core loss and decreased efficiency. In the exemplary embodiment, motor 300 is fitted with modified rotor 302 to increase efficiency. Typically, rotor cores and stator cores have the same length. In the exemplary embodiment, rotor 302 is reduced in length compared to a stator core 28 so that rotor 302 generates less flux at the higher speeds. This enables motor 300 to operate at the higher desired operating speeds with increased efficiency with reduced core loss. Moreover, shorter length rotor 302 requires less material and reduces the cost of motor 300. Additionally, flux density output of motor 300 is reduced by reducing the number of turns of windings 306. In the exemplary embodiment, windings 306 are fabricated from copper and/or aluminum. Alternatively, windings 306 are fabricated from any suitable material that enables motor 300 to function as described herein. In another embodiment, flux density output of motor 300 is reduced by using a lower remnance permanent magnet, a magnet with a reduced width, and/or a magnet with a shallower radial depth.

In the exemplary embodiment, the length of rotor 302 (compared to the original rotor) is dependent on the higher operation speed desired by the new application. For example, in one embodiment, motor 300 is originally designed to operate at a typical speed of 1,200 RPM and includes a stator and rotor with lengths of approximately 1.75 inches. The new motor application requires motor 300 to operate at 6,000 RPM, and motor 300 is fitted with modified, reduced-length rotor 302, which is approximately 1 inch in length. As described above, motor 300 is modified with rotor 302 and/or windings 306 to enable motor 300 to be used for high speed applications without having to design a new motor platform specifically designed for the high speed application.

Described herein are exemplary methods, systems and apparatus utilizing lower cost materials in a permanent magnet motor that reduces or eliminates the efficiency loss caused by the lower cost material. Furthermore, the exemplary methods system and apparatus achieve increased efficiency while reducing or eliminating an increase of the length of the motor. The methods, system and apparatus described herein may be used in any suitable application. However, they are particularly suited for HVAC and pump applications.

Exemplary embodiments of the electric motor assembly are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent magnet rotor comprising:
   a substantially cylindrical rotor core comprising an outer edge, an inner edge, and opposed first and second ends, said rotor further comprising a first wall and a second wall defining at least one radial aperture extending radially through said rotor core;
   at least one permanent magnet positioned within said at least one radial aperture;
   a first indentation formed in one of said at least one permanent magnet and said first wall, and a second indentation formed in the other one of said at least one permanent magnet and said first wall, wherein said first indentation is defined entirely between said inner edge and said outer edge, said first indentation defining a first space between said at least one permanent magnet and said radial aperture first wall, the first space extending between a radially inner end and a radially outer end, said first indentation including a first radius of curvature and said second indentation including a second radius of curvature larger than the first radius of curvature; and
   a first material located within said first space such that said first material is located entirely between said radially inner end and said radially outer end, said material configured to substantially prevent movement of said at least one permanent magnet relative to said at least one radial aperture.

2. The rotor of claim 1, wherein said at least one permanent magnet comprises said first indentation and said first wall comprises said second indentation, said first and second indentations substantially aligned to define said first space.

3. The rotor of claim 2, further comprising a third indentation formed in said at least one permanent magnet and a fourth indentation formed in at least one of said first and second wall, said third and fourth indentations substantially aligned to define a second space.

4. The rotor of claim 3, wherein a second material is positioned within said second space, said material configured to prevent movement of said at least one permanent magnet relative to said at least one radial aperture.

5. The rotor of claim 1, wherein said first material is resilient.

6. The rotor of claim 1, wherein said first material comprises at least one of extruded plastic, injection molded plastic, expanding material, and rubber.

7. The rotor of claim 1, wherein said first material comprises a hollow outer member and an inner member inserted into said outer hollow member, said outer hollow member more resilient than said inner member.

8. The rotor of claim 1, wherein said first space extends from said rotor core first end to said rotor core second end.

9. The rotor of claim 8, wherein said first material comprises a plurality of segments.

10. The rotor of claim 1, wherein said first material is a biasing mechanism.

11. A method of manufacturing a permanent magnet rotor, the method comprising:
providing a rotor core comprising an outer edge, an inner edge, and opposed first and second ends, said rotor further comprising a first and second wall defining at least one radial aperture extending radially through the rotor core;
providing a permanent magnet;
forming a first indentation in one of the permanent magnet and the first wall, wherein the first indentation is defined entirely between the inner edge and the outer edge;
forming a second indentation in the other one of the permanent magnet and the first wall, the first indentation including a first radius of curvature and the second indentation including a second radius of curvature larger than the first radius of curvature;
inserting the permanent magnet into the at least one radial aperture such that the first indentation defines a first space between the permanent magnet and the first wall, the first space extending between a radially inner end and a radially outer end; and
inserting a first material into the first space from at least one of said first and second ends such that the first material is located entirely between the radially inner end and the radially outer end, the first material configured to substantially prevent movement of the permanent magnet relative to the first and second walls.

12. The method of claim 11, wherein forming a first indentation and a second indentation includes forming a first indentation in the first wall and forming a second indentation in the permanent magnet such that the first and second indentations are substantially aligned to form the first space when the permanent magnet is inserted into the at least one radial aperture.

13. The method of claim 11, wherein the first material is resilient.

14. The method of claim 11, wherein said inserting the first material into the first space comprises at least one of inserting extruded resilient material into the first space, injection molding a material into the first space, and inserting expandable material into the first space.

15. The method of claim 11, wherein said inserting the first material into the first space comprises inserting a hollow outer member into the first space and inserting an inner member into the hollow outer member, wherein the hollow outer member is more resilient than the inner member.

16. The method of claim 11, wherein the first space extends from the rotor core first end to the rotor core second end.

17. The method of claim 11, wherein the first material comprises a plurality of segments.

18. The method of claim 11, wherein the first material is a biasing mechanism.

19. The method of claim 11, further comprising forming a third indentation in the at least one permanent magnet and forming a fourth indentation in at least one of the first and second walls, wherein the third and fourth indentations are substantially aligned to define a second space, and inserting a second material into the second space, the second material configured to substantially prevent movement of the permanent magnet relative to the first and second walls.

* * * * *